(12) United States Patent
Kenway et al.

(10) Patent No.: US 9,611,868 B2
(45) Date of Patent: Apr. 4, 2017

(54) SYSTEM AND METHOD FOR ENERGY STORAGE AND RETRIEVAL

(71) Applicant: Shipstone Corporation, Calgary (CA)

(72) Inventors: Daniel John Kenway, Calgary (CA); David Kenway, Calgary (CA); Will Bauer, Calgary (CA)

(73) Assignee: Shipstone Corporation, Alberta (CA)

( * ) Notice: Subject to any disclaimer, the term of this patent is extended or adjusted under 35 U.S.C. 154(b) by 0 days.

(21) Appl. No.: 14/295,323

(22) Filed: Jun. 3, 2014

(65) Prior Publication Data

US 2016/0025111 A1 Jan. 28, 2016

Related U.S. Application Data

(63) Continuation-in-part of application No. 14/205,211, filed on Mar. 11, 2014, which is a continuation of application No. 13/084,509, filed on Apr. 11, 2011, now Pat. No. 8,667,788.

(60) Provisional application No. 61/322,778, filed on Apr. 9, 2010, provisional application No. 61/467,168, filed on Mar. 24, 2011, provisional application No. 61/446,387, filed on Feb. 24, 2011, provisional application No. 61/443,171, filed on Feb. 15, 2011.

(51) Int. Cl.
| | | |
|---|---|---|
| *F15B 1/033* | (2006.01) | |
| *B60L 11/16* | (2006.01) | |
| *F02C 6/16* | (2006.01) | |
| *G05F 3/04* | (2006.01) | |
| *H02J 1/00* | (2006.01) | |

(52) U.S. Cl.
CPC ............. *F15B 1/033* (2013.01); *B60L 11/16* (2013.01); *F02C 6/16* (2013.01); *G05F 3/04* (2013.01); *H02J 1/00* (2013.01); *F05D 2260/406* (2013.01); *Y02E 60/15* (2013.01); *Y10T 307/549* (2015.04)

(58) Field of Classification Search
CPC .. F15B 1/033; F15B 1/04; F15B 11/17; F15B 15/08; Y02E 60/15
USPC ................... 60/370, 407, 415, 417; 417/438
See application file for complete search history.

(56) References Cited

U.S. PATENT DOCUMENTS

| | | |
|---|---|---|
| 3,947,736 A | 3/1976 | Byers |
| 3,971,972 A | 7/1976 | Stich |

(Continued)

FOREIGN PATENT DOCUMENTS

| | | |
|---|---|---|
| CN | 101828319 A | 9/2010 |
| WO | 2006034748 A1 | 4/2006 |

(Continued)

OTHER PUBLICATIONS (Thesis N 3628 (2006), Swiss Federal Institute of Technology, Lausanne (EPFL Lausanne—Switzerland).

(Continued)

*Primary Examiner* — Thomas E Lazo
(74) *Attorney, Agent, or Firm* — Gilbert's LLP; Matthew D. Powell

(57) ABSTRACT

Disclosed herein is an isothermal liquid piston natural gas compression and expansion system for storing and retrieving energy in large quantities that employs an existing infrastructure embodied in the natural gas pipeline and storage system, including the natural gas as a medium for the storage and retrieval of pressure energy for large scale sustainable energy storage.

6 Claims, 27 Drawing Sheets

(56) References Cited

U.S. PATENT DOCUMENTS

| | | | | |
|---|---|---|---|---|
| 4,041,708 | A | * | 8/1977 | Wolff .................... F04D 31/00 60/649 |
| 4,128,793 | A | | 12/1978 | Stich |
| 4,286,203 | A | | 8/1981 | Ehret |
| 4,364,037 | A | | 12/1982 | Walker |
| 4,364,073 | A | | 12/1982 | Becke et al. |
| 4,593,202 | A | | 6/1986 | Dickinson |
| 4,618,810 | A | | 10/1986 | Hagerman et al. |
| 5,021,125 | A | | 6/1991 | Phillips et al. |
| 5,537,822 | A | | 7/1996 | Shnaid et al. |
| 5,634,340 | A | * | 6/1997 | Grennan .................. F02C 1/02 60/648 |
| 5,771,693 | A | * | 6/1998 | Coney .................... F04B 31/00 417/381 |
| 7,607,503 | B1 | | 10/2009 | Schechter |
| 7,802,426 | B2 | | 9/2010 | Bollinger |
| 8,454,321 | B2 | | 6/2013 | Ingersoll et al. |
| 8,667,788 | B2 | * | 3/2014 | Kenway ................. B60L 11/16 60/415 |
| 2009/0301069 | A1 | | 12/2009 | Bollinger |
| 2009/0301089 | A1 | * | 12/2009 | Bollinger ............. H02J 15/006 60/652 |

FOREIGN PATENT DOCUMENTS

| | | |
|---|---|---|
| WO | 2008002178 A1 | 1/2008 |
| WO | 2008139267 A1 | 11/2008 |
| WO | 2009034421 A1 | 3/2009 |
| WO | 2009076757 A1 | 6/2009 |
| WO | 2010035795 A1 | 4/2010 |
| WO | 2010135658 A2 | 11/2010 |

OTHER PUBLICATIONS

Van de Ven, J, D., and Li, P. Y.. 2009, "Liquid Piston Gas Compression," Applied Energy, v. 36, n. 10, p. 2183-2191).

Bose, Birmal K. (1980). Adjustable Speed AC Drive Systems. New York: IEEE Press. ISBN 0-87942•146-0.

Heinlein, R. (1982). Friday. New York, Holt Reinhart and Winston—Shipstone.

Hydraulic System Design for Service Assurance (vol. 3 of Computerized Fluid Power Series, E.C. Fitch and I.T. Hong, BarDyne Incorporated, 2001).

International Preliminary Report on Patentability PCT/CA2011/000405.

International Search Report PCT/CA2011/000405.

Written Opinion of the International Searching Authority PCT/CA2011/000405.

\* cited by examiner

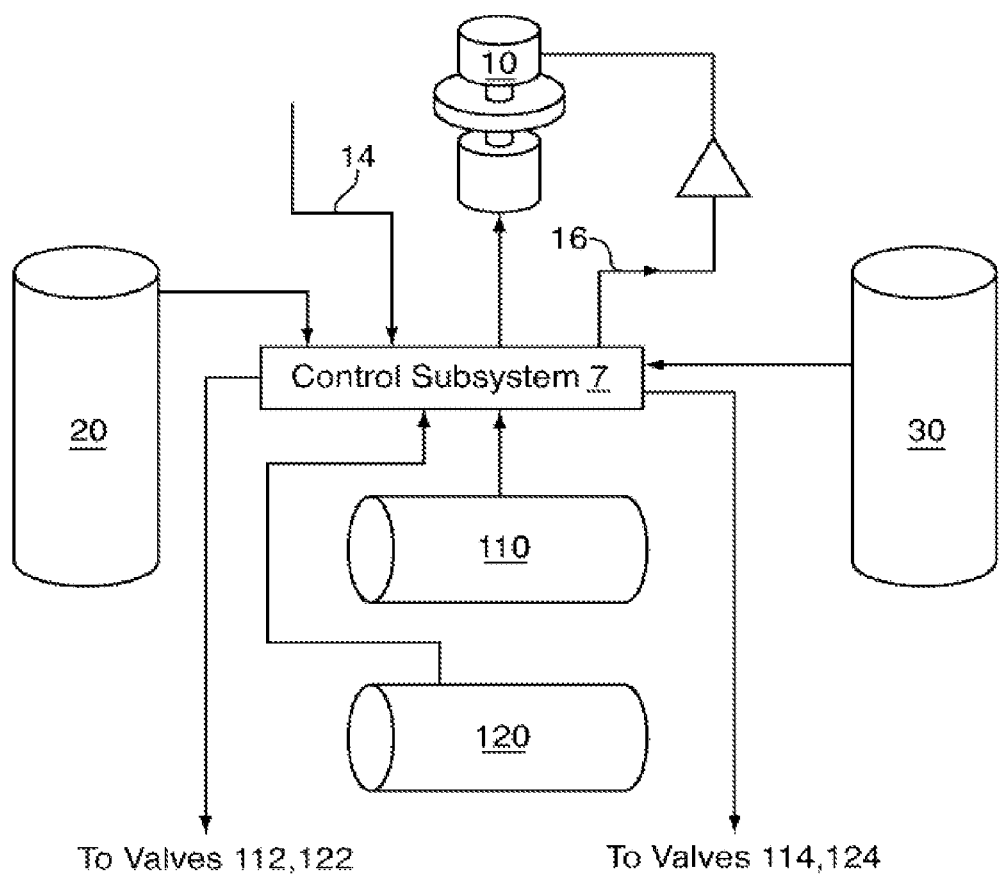

SYSTEM AND METHOD FOR ENERGY
STORAGE AND RETRIEVAL

CROSS REFERENCE TO RELATED
APPLICATIONS

This application is a continuation-in-part of U.S. patent application Ser. No. 14/205,211 filed on Mar. 11, 2014, which is a continuation of U.S. patent application Ser. No. 13/084,509 filed on Apr. 9, 2011, now U.S. Pat. No. 8,667,788 issued on Mar. 11, 2014, and claims priority under 35 U.S.C. 119(e) from U.S. Provisional Patent Application No. 61/322,778 filed on Apr. 9, 2010, U.S. Provisional Patent Application No. 61/446,387 filed on Feb. 24, 2011, U.S. Provisional Patent Application No. 61/443,171 filed on Feb. 15, 2011, and U.S. Provisional Patent Application No. 61/467,168 filed on Mar. 24, 2011, the contents of each of which are incorporated herein by reference in their entirety.

FIELD OF THE INVENTION

This application relates generally to power conversion and energy storage, and more particularly to systems and methods for and relating to storing and retrieving energy in and from compressed gas.

BACKGROUND OF THE INVENTION

It is desirable to develop both processes and apparatus which will allow for efficient storage and retrieval of energy. Improvements in energy storage and retrieval have important applications in many different fields, such as in systems in automobiles, or the buffering of energy produced by intermittent sources (like wind turbines or solar panels) so that the energy may be accumulated, stored and then released when needed (or when the price is highest in reflection of that need).

Many different types of energy storage system are already well known. The most common of these are rechargeable electrical batteries including simple common examples like lead acid batteries in automobiles, and extending to more recent innovations in Lithium ion based and other cells. Rechargeable electrical cells are among the most widely used common energy storage/retrieval systems. In other scales and time frames—flywheels may be used to keep the rotational speed of generators or shafts constant, water may be pumped up hill to provide large scale energy storage and retrieval systems when used in conjunction with hydroelectric dams, and at least two instances exist of Compressed Air Energy Storage (CAES) where wind farms (or other intermittent sources) are used to generate electricity which is used to power compressors which pump compressed air into underground caverns where the potential energy within the compressed air remains stored. The stored energy may then be used to provide most of the drive to gas expansion turbines (like the General Electric LM2500) but because of the thermodynamics of expanding gas from 1000 psi to 15 psi (1 atmosphere) large temperature losses occur within the expanded gas, and to maintain an operational system natural gas must be burned in the gas turbines to provide adequate heat to allow for "reasonable" operating temperatures.

There are known problems with known CAES systems, and these relate to two specific areas. First, known systems are not truly "renewable" because they rely on the burning of natural gas (or some other fuel) to provide heat to balance the thermodynamics of the system. Second, they are relatively inefficient with a total efficiency of between 30 and 40 percent (where efficiency is defined as the amount of energy out divided by the amount of energy in).

Rufer et al. in WO 2008-139267 have identified the ultimate basic efficiencies possible through the use of piston compression and expansion of gas, and in particular through the use of liquid pistons to achieve this compression/expansion. Rufer et al. teach the use of a shuttling device to separate hydraulic motor pump fluid from the working fluids of the storage vessel, and about the energy densities, and efficiencies which are attainable with such an apparatus. Rufer et al. further teach that heat exchange within the "liquid piston" part of the apparatus will improve the possible energy densities. If one chooses either of two boundary conditions for the physical system responsible for the gas compression expansion—either adiabatic or isothermal, then it follows that the process itself (not realizable in a real world apparatus) could be 100 percent efficient. Rufer et al. teach, however, that a process which is quasi-isothermal will achieve much better energy storage densities per unit volume of compressed gas.

Further details are provided in the Ph. D. thesis of Sylvain LEMOFOUET-GATSI, entitled "Investigation and optimisation of hybrid electricity storage systems based on compressed air and supercapacitors." (Thesis N 3628 (2006), Swiss Federal Institute of Technology, Lausanne (EPFL Lausanne-Switzerland).

In the publication by Van de Ven, J. D., and Li, P. Y., 2009, "Liquid Piston Gas Compression," *Applied Energy*, v. 86, n. 10, p. 2183-2191), there is taught the high efficiencies (greater than 83 percent) obtainable with liquid piston compressors.

Kenway at el. in PCT Application Publication WO 2009-076757 teach that the thermodynamics may be better managed by limiting the gas compression ratios to approximately 3.2:1. The disclosed apparatus makes use of common commercially-available components to achieve the implementation of hydraulic-pneumatic compression.

Adler and Siebert in PCT Application Publication WO 2006-034748 further teach of the practical realizable design of a device for compressing a gaseous medium, particularly hydrogen. It is taught that by use of an appropriate liquid (an ionic liquid), it is possible to achieve very high compression (and compression ratios) since the full advantages of liquid pistons can be exploited without fear of cavitation of the drive pump(s)/motor(s).

Cavitation (or fizz) is the highly destructive appearance of bubbles formed by entrained gases and usually nucleated around small impurities in the hydraulic fluid. If the expansion of the gas is for example 1000 times, then a bubble that was entrained at a scale of 10 microns expands to 10 mm with the destructive force of a small explosion.

Adler and Siebert and Van Ven and Li further teach that the liquid pistons easily accommodate heat exchangers in the compression chamber (or cylinder) so that maintaining quasi-isothermal conditions is much more easily achieved than with conventional compressors or expanders.

The following references are also of use for understanding the state of the art: U.S. Pat. No. 3,947,736 (Byers et al.); U.S. Pat. No. 4,286,203 (Ehret); U.S. Pat. No. 3,971,972 (Stitch); U.S. Pat. No. 4,128,793 (Stitch); U.S. Pat. No. 4,618,810 (Hagerman et al.); U.S. Pat. No. 4,364,073 (Becke et al.); Bose, Bimal K. (1980). Adjustable Speed AC Drive Systems. New York: IEEE Press. ISBN 0-87942-146-0; Heinlein, R. (1982). Friday. New York, Holt Reinhart and Winston-Shipstone.

SUMMARY OF THE INVENTION

The use of underground reservoirs (geological structures including salt caverns) for use in the storage of energy by compression of air is taught by Gyarmathy (U.S. Pat. No. 4,100,745), Dickenson (U.S. Pat. No. 4,593,202), Vadas et al. (U.S. Pat. No. 4,677,307), Nakhamkin (U.S. Pat. Nos. 4,765,142, 4,872,307, 4,936,098) and Grennan (U.S. Pat. No. 5,634,340). All of these sources teach that the energy of compression of air can be recovered in a variety of systems which all rely upon the burning of fuel to maintain the temperature of the machinery and supply heat to the expansion process during gas expansion. Further all of these teachings are uniform in contemplating the use of air as the medium of storing the energy in the gas, and the use of combustion in the recovery of the energy of expansion. None of these teachings recognize the enormous infrastructure that is existing in the form of pipelines constructed to move pressurized natural gas, or pressurized underground and above ground reservoirs for the storage of compressed natural gas (CNG).

In accordance with an aspect, there is provided a system for storing and releasing energy, comprising a generator/motor subsystem; a hydraulic pump for pumping hydraulic fluid between first and second pump ports in response to force applied by the generator/motor subsystem and also capable of imparting force to the generator/motor subsystem in response to hydraulic fluid being caused to flow between the first and second pump ports; a first compression/expansion vessel for exchanging hydraulic fluid with the hydraulic pump via the first pump port; a second compression/expansion vessel for exchanging hydraulic fluid with the hydraulic pump via the second pump port; a gas storage subsystem for selectively storing gas from, or releasing gas to, the first and second gas compression/expansion vessels; an internal heat exchanger within each of the first and second compression/expansion vessels for exchanging heat between the hydraulic fluid and the gas therein, each internal heat exchanger having a very large thermal mass relative to the mass of gas within the first and second compression/expansion vessels; a control subsystem for controlling at least a plurality of gas valves associated with the gas storage subsystem to switch between the storing and releasing, wherein, during storing, responsive to hydraulic fluid being pumped by the hydraulic pump between the first and second pump ports, gas is caused to be compressed in the gas storage subsystem thereby to store energy, and wherein, during releasing, responsive to pressure from release of compressed gas from the gas storage subsystem, hydraulic fluid is forced to flow between the first and second pump ports thereby to release energy, wherein the gas is natural gas, and natural gas pipelines and storage reservoirs and CNG reservoirs are used as low and high pressure reservoirs to store the energy of compression of the gas.

In accordance with another aspect, there is provided a use of isothermal liquid piston based gas compression and expansion in conjunction with natural gas pipelines, CNG storage reservoirs, and high pressure geological reservoirs to store and retrieve large quantities of energy by means of using the pressure energy of the gas as the storage medium.

In accordance with another aspect, there is provided a system comprising an isothermal liquid piston compressor/expander connected to a natural gas pipeline and storage reservoir system and configured to store and retrieve large amounts of energy.

In an embodiment, energy from an electrical power grid is stored and energy retrieved is conveyed to the electrical power grid.

In an embodiment, energy from one or more renewable energy sources is stored and retrieved for dispatching to the electrical power grid.

Use of isothermal liquid piston compression and expansion in conjunction with a multiplicity of geological natural gas reservoirs, wherein each reservoir is located at a respective different depth and a different operating pressure, for storing and retrieving large quantities of energy.

In accordance with another aspect, there is provided a system for storing energy comprising a plurality of geological natural gas reservoirs each located at a respective different depth and operating pressure, the plurality of geological natural gas reservoirs interconnected through respective one or more isothermal liquid piston compressor/expanders.

In accordance with another aspect, there is provided a system for storing energy comprising at least one geological natural gas storage reservoir, at least one surface CNG storage reservoir, the natural gas storage reservoir and the at least one surface CNG storage reservoir being interconnected through one or more isothermal liquid piston compressor/expanders.

In accordance with another aspect, there is provided a system for storing and releasing energy comprising a natural gas pipeline connected to a conventional gas compressor coupled in a loop with an isothermal liquid piston gas expander connected on a high pressure side to a geological reservoir, wherein the isothermal liquid piston natural gas expander is acting in place of a JT valve. In an embodiment, the system is used to store and retrieve energy from an electrical power grid.

In accordance with another aspect, there is provided an isothermal liquid piston gas expander to recover energy that is already stored within the natural gas pipeline system at points where the pipeline gas pressure is let down. In an embodiment, points where the pipeline gas pressure is let down comprises points where higher pipeline pressures must be reduced for distribution to end users, or other smaller pipeline systems.

Other aspects and embodiments are disclosed herein.

BRIEF DESCRIPTION OF THE DRAWINGS

Embodiments will now be described more fully with reference to the accompanying drawings in which:

FIG. 2 is a schematic diagram of connections of a control subsystem with various components of the system of FIG. 1;

DETAILED DESCRIPTION OF EMBODIMENTS

Figure 1:
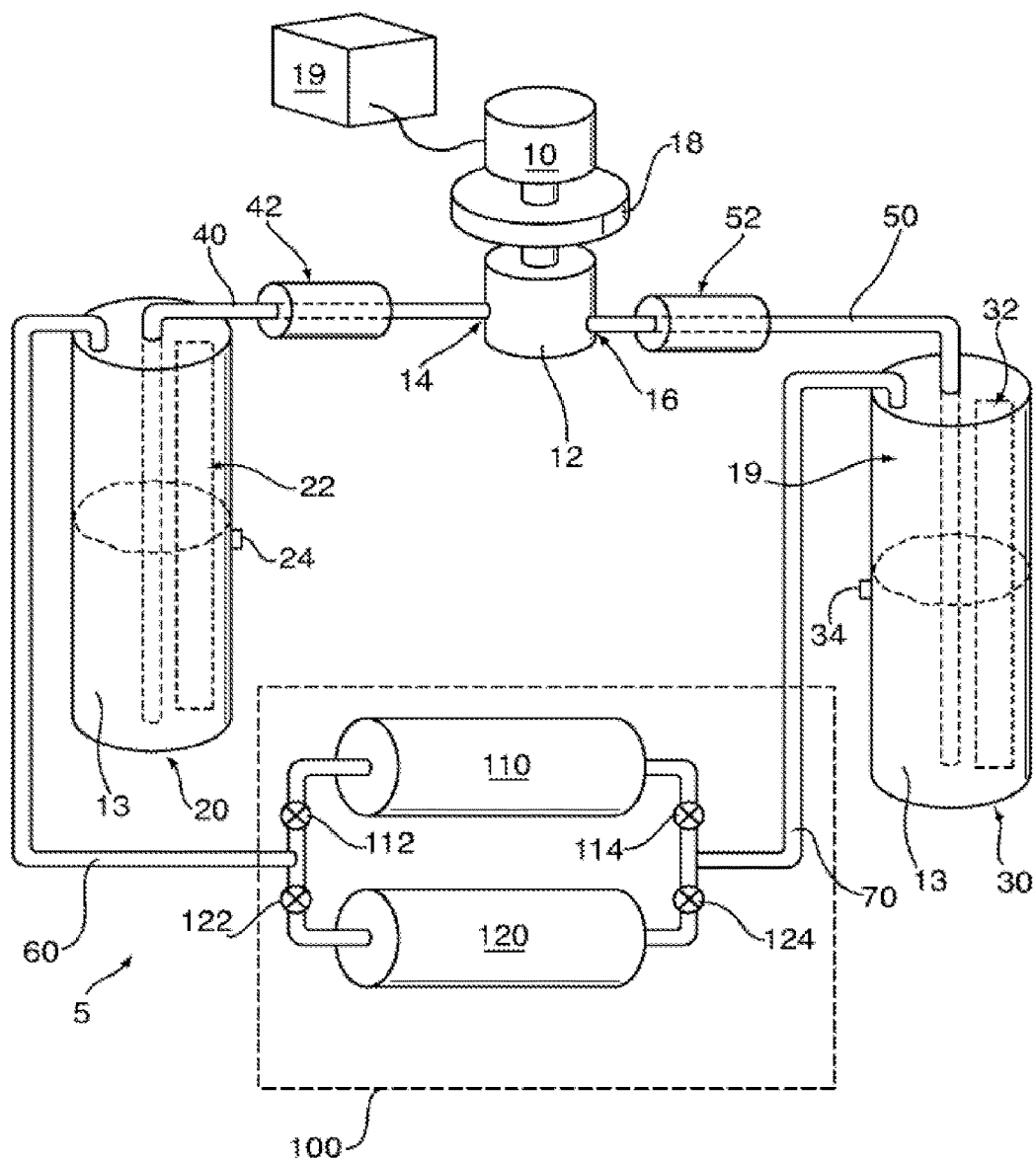
FIG. 1 is a schematic diagram of a system for storing and retrieving energy using compressed gas, according to an embodiment.

Turning now to FIG. 1, a system for storing and retrieving (i.e. releasing) energy according to an embodiment of the invention is shown and generally identified by reference numeral 5. System 5 is controlled by a control subsystem 7 which, in this embodiment is a programmable logic controller (PLC) but which could be implemented alternatively by another device such as a personal computer or the like with appropriate interface hardware. System 5 also comprises a generator/motor subsystem that, in this embodiment, comprises a single generator/motor 10 mechanically coupled to a hydraulic pump 12 with a shaft coupler so as to impart rotational force to the hydraulic pump 12 thereby to pump hydraulic fluid 13 between a first port 14 and a second port 16 of the hydraulic pump 12 during energy storing. Furthermore, generator/motor 10 and hydraulic pump 12 are mechanically coupled such that hydraulic pump 12 can impart rotational force to the generator/motor 10 in response to hydraulic fluid 13 being pumped between the first and second ports 14, 16 during energy releasing, as will be described.

In this embodiment, generator/motor 10 is a three-phase AC (Alternating Current) generator/motor with exciter windings that function as the prime mover for the hydraulic pump 12 upon application of electrical power during storing of energy, and that function as an electrical generator upon rotation by the hydraulic pump 12 during releasing of energy.

In this embodiment, hydraulic pump 12 has a variable displacement and an over-the-centre configuration, and thereby has a shaft that rotates in only one direction (for example, clockwise), whether hydraulic fluid 13 is flowing from the first port 14 to the second port 16, or from the second port 16 to the first port 14. That is, despite the direction of flow of hydraulic fluid 13, throughout storing and releasing, hydraulic pump 12 rotates in a single direction. The hydraulic pump 12 comprises filters, valves and charge pressure circuitry for its operation. In this embodiment, valve(s) (not shown for ensuring FIG. 1 is straightforward to understand) in hydraulic pump 12 are each electronically controlled via signals provided by the control subsystem 7.

A flywheel 18 is mechanically coupled to the shaft coupler for maintaining rotation during fluid flow through hydraulic pump 12, pressure changes, changes in the direction of flow between ports 14 and 16 of the hydraulic fluid 13, and mode changes (i.e., from energy storing to energy releasing and vice-versa, as will be described). The flywheel 18 provides additional angular momentum which may be converted to electrical energy by the generator/motor by means of loss of rpm for the short term, which in this embodiment is between about 1 and 10 seconds.

A power conditioning module 19 is coupled between the generator/motor 10 and electrical mains (not shown) to control the generator/motor 10 and to condition power from the generator/motor 10 for use in supplying power to electrical mains. In this embodiment, power condition module 19 is an inverter preceded by rectification diodes and a stiff DC capacitor. Power conditioning in the opposite direction between the mains and the motor aspect of the generator/motor subsystem is of course a similar circuit in reverse—a Variable Frequency Drive.

The hydraulic pump 12 is in fluid communication with an interior volume of a first compression/expansion vessel 20 via a fluid line 40 that runs from the first port 14, through the exterior wall of the first compression/expansion vessel 20, and terminates near to the bottom of its interior volume. Hydraulic fluid 13 is permitted to flow between the hydraulic pump 12 and the interior volume of first compression/expansion vessel 20 via fluid line 40.

The hydraulic pump 12 is also in fluid communication with an interior volume of a second compression/expansion vessel 30 via a fluid line 50 that runs from the second port 14, through the exterior wall of the second compression/expansion vessel 30, and terminates near to the bottom of its interior volume. Hydraulic fluid 13 is permitted to flow between the hydraulic pump 12 and the interior volume of the second compression/expansion vessel 30 via fluid line 50.

Fluid lines 40 and 50 are constructed of any material or materials that is/are capable of withstanding pressures imparted to the hydraulic fluid 13 in system 5, such as steel.

In this embodiment, the hydraulic fluid 13 is KRYTOX™, which is a non-flammable, non-reactive liquid suitable for use with compression of gases that include oxygen, such as air. Other suitable hydraulic fluids may be employed.

The interior volume of the first compression/expansion vessel 20 is also in fluid communication with a gas storage subsystem 100 via a gas line 60 that runs from near to the top of the interior volume of first compression/expansion vessel 20, through its exterior wall, to the gas storage subsystem 100.

The interior volume of the second compression/expansion vessel 30 is also in fluid communication with the gas storage subsystem 100 via a gas line 70 that runs from near to the top of the interior volume of second compression/expansion vessel 30, through its exterior wall, to the gas storage subsystem 100.

Gas lines 60 and 70 are constructed of any material or materials that is/are capable of withstanding pressures imparted to the gas in system 5, such as steel.

At least one liquid level transducer 24 is disposed within the interior volume of the first compression/expansion vessel 20, and generates liquid level signals indicative of the level of hydraulic fluid 13 within the first compression/expansion vessel 20. Similarly, at least one liquid level transducer 34 is disposed within the interior volume of the second compression/expansion vessel 30, and generates signals indicative of the level of hydraulic fluid 13 within the second compression/expansion vessel 30. Control subsystem 7 receives the liquid level signals from liquid level transducers 24, 34 for controlling system 5 accordingly. Generally, the control subsystem 7 ensures that hydraulic fluid 13 does not enter gas lines 60, 70. The liquid level transducers 24, 34 generate respective signals that can be received by control subsystem 7 outside of the first and second expansion/compression vessels 20, 30. It will be understood that such signals may be provided to control subsystem 7 by wire or by both wire and wirelessly.

A first internal heat exchanger 22 is also disposed within the interior volume of the first compression/expansion vessel 20, and a second internal heat exchanger 32 is also disposed within the interior volume of the second compression/expansion vessel 30. Each of the internal heat exchangers 22, 32 functions to exchange heat between any hydraulic fluid 13 within the compression/expansion vessels 20, 30 and any gas within that is being compressed/expanding within respective compression/expansion vessels 20, 30. The heat exchanger exists everywhere within the volume of the compression/expansion modules and is thermally massive (physical density approximately 1 gm/cc) and porous (displacing less than 25% of the available volume). Because the internal heat exchanger is thermally massive relative to the gas, and everywhere, it is difficult for the gas to change temperature much, and the process remains quasi-isothermal. As the liquid of the liquid piston passes in and out of this porous massive internal heat exchanger, it captures the heat trapped within the heat exchanger, so the heat is transferred to the liquid hydraulic fluid.

A first external heat exchanger 42 associated with the fluid line 40 functions to exchange heat between hydraulic fluid 13 within the fluid line 40 and the ambient atmosphere. Similarly, a second external heat exchanger 52 associated with the fluid line 42 functions to exchange heat between hydraulic fluid 13 within the fluid line 42 and the ambient atmosphere.

First internal heat exchanger 22, second internal heat exchanger 32, first external heat exchanger 42 and second external heat exchanger 52 generally cooperate to provide heat exchange between the ambient atmosphere outside of the first and second compression/expansion vessels 20, 30 and the gas within the first and second compression/expansion vessels 20, 30. Such heat exchange is important for maintaining system efficacy and efficiency by enabling quasi-isothermal conditions to exist with system 5. As a result, the gas under compression expansion and even the hydraulic fluid 13 is generally maintained at a substantially constant temperature.

United States Patent Application 2007/0258828 (Adler et al.) discloses that with a liquid piston compressor, it is possible to mount a heat exchanger within the compression chamber of a liquid piston gas compressor. It is also mentioned that passive heat exchange may be possible by partially filling the volume with spheres or plates.

PCT Application 2010/135658 A2 (Aborn and Ingersoll) disclose that thin cup like structures can be used within the apparatus to catch gas bubbles, and thereby improve the heat exchange.

U.S. Pat. No. 7,802,426 (Bollinger) discloses that high efficiency near-isothermal compression of gas may be achieved by externally circulating a stream of that gas through an external heat exchanger. It is taught that, if rates of compression and heat exchange flow are chosen appropriately, and the compression rate is sufficiently slow then near-isothermal results may be achieved.

PCT Application Publication WO 2008/139267 (Lemofouet et al.) discloses that heat exchange within the compression chamber may be achieved by turning the liquid into a shower of droplets as it fills the compression chamber.

PCT Application Publication WO 2009/034421 (Lemofouet et al.) teaches that the heat exchanger may be much more effective in both compression and expansion if it is implemented as a structure of many small tubes (something like a conventional heat exchanger) with one independent flow for liquid piston gas compression, and the other for merely flowing heat exchanging fluid past the encapsulated compression or expansion process.

In this embodiment of the invention disclosed herein, internal heat exchangers 22 and 32 are identical to each other, and are made of metal foam. It is preferable that the internal heat exchangers 22, 32 are each distributed throughout substantially the entire interior volume of its respective vessel 20, 30 so that access to heat exchange is available nearby (about 1 millimeter or less, preferably) to molecules substantially throughout the entire interior volume. Thus, there is provided a large, available, thermal mass for heat transfer. In this way, quasi-isothermal operation of the system 5 can be best maintained. Preferably, for metal foam internal heat exchangers 22, 32, substantially all pores in the metal foam have a size that is less than about 5 cubic millimeters. However, alternative structures may be provided that are not as efficient at transferring heat between the gas and the hydraulic fluid 13 (or other liquid piston material in a two-liquid system as will be described) and that thus provide less rapid heat transfer. Care should be taken with the configurations of internal heat exchangers 22 and 32, because in practical systems the time required to compress or expand gas inversely proportional to the power levels achievable with such systems, and similarly is inversely proportional to the "value" of the compressor, which would without such care have a lower free air delivery (FAD) or effective power level.

Alternatively, internal heat exchangers 22, 32 may be positioned only near to the top of the interior volume of its respective compression/expansion vessel 20, 30 where molecules' access to heat exchange is most critical for providing quasi-isothermal operation of system 5 due to the rapidity of temperature changes in the gas being compressed or expanding.

Using mesh or metal foam, the percentage of compression volume filled by the internal heat exchangers 22, 32, despite the ubiquity of the heat exchangers 22, 32 within the internal volumes, can be maintained at 25% and even down to 3% of the compression volume.

While metal foam or mesh has been referenced in embodiments described above for the internal heat exchangers 22, 32, it will be understood that alternatives are possible. For example, internal heat exchange may similarly be provided by a highly porous sintered plug of metal, and/or by a tightly wound metal coil, and/or by a subsystem of formed tubes or fingers of conductive material. Conductive materials such as metals chosen may be copper and/or aluminum. Other materials may be used for the internal heat exchangers 22, 32, as desired. Furthermore, the internal heat exchangers 22, 32 may be connected to the fluid lines 40, 50, or be integrated with fluid lines 40, 50 in some manner.

Figures 3A, 3B, 3C, 3D:
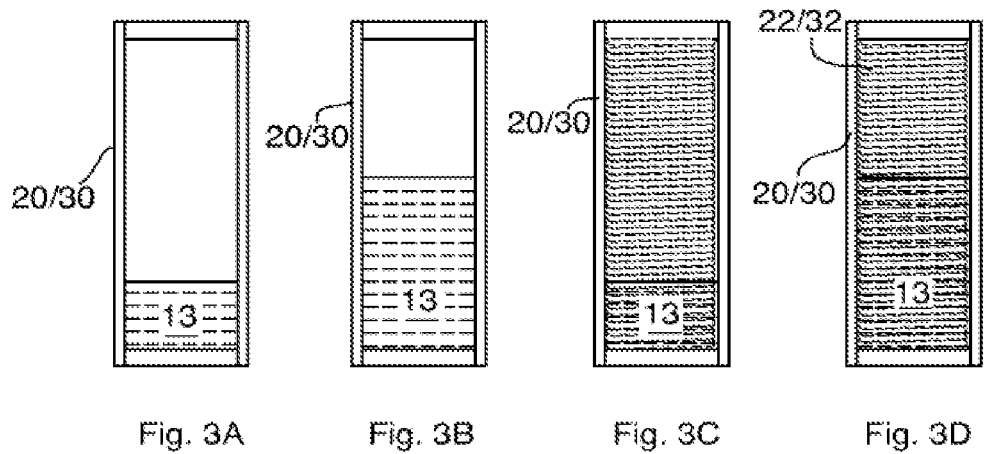
FIGS. 3A and 3B are diagrams of a compression/expansion vessel for the system of FIG. 1 without an internal heat exchanger, and respective different hydraulic fluid levels therewithin.
FIGS. 3C and 3D are diagrams of a compression/expansion vessel for the system of FIG. 1 with an internal heat exchanger, and respective different hydraulic fluid levels.

FIGS. 3A and 3B are diagrams of a compression/expansion vessel 20 or 30 without an internal heat exchanger, and respective different hydraulic fluid levels therewithin. FIGS. 3C and 3D are diagrams of a compression/expansion vessel 20 or 30 with an internal heat exchanger in the form of a tightly wound spiral copper mesh positioned within the interior volume, and respective different hydraulic fluid levels.

In this embodiment, the gas storage subsystem 100 comprises a high pressure gas chamber 110 and a low pressure gas chamber 120. Gas line 60 from first compression/expansion vessel 20 provides for fluid communication with the high pressure gas chamber 110 for the exchange of gas, depending on whether a first high pressure chamber gas valve (FHPcV) 112 is controlled to be open or closed. Similarly, gas line 70 from second compression/expansion vessel 30 provides for fluid communication with the high pressure gas chamber 110 for the exchange of gas, depending on whether a second high pressure chamber gas valve (SHPcV) 114 is controlled to be open or closed. Also, gas line 60 from first compression/expansion vessel 20 provides for fluid communication with the low pressure gas chamber 120 for the exchange of gas, depending on whether a first low pressure chamber gas valve (FLPcV) 122 is controlled to be open or closed. Also, gas line 70 from second compression/expansion vessel 30 provides for fluid communication with the low pressure gas chamber 120 for the exchange of gas, depending on whether a second low pressure chamber gas valve (FLPcV) 124 is controlled to be open or closed. Electrical control of the open/closed states of FHPcV 112, SHPcV 114, FLPcV 122 and SLPcV 124, and thereby control for the storing and releasing of gas in gas storage subsystem 100 is provided by control subsystem 7 as will be described herein.

Gas pressure transducers (not shown so as to ensure FIG. 1 is straightforward to read) for measuring gas pressure within each compression/expansion vessel 20, 30, each of the high pressure and low pressure gas chambers 110, 120 are provided and communicate with the control subsystem 7 for providing pressure data for the gas within these components. This pressure data is received by the control subsystem 7 and used during control of the operation of system 5. Furthermore, one or more hydraulic liquid pressure transducers (not shown so as to ensure FIG. 1 is straightforward to read) for measuring hydraulic fluid pressure in the system 5 is/are provided and communicate with the control subsystem 7 for providing pressure data for the hydraulic fluid in the system 5.

FIG. 2 is a schematic diagram of connections of the control subsystem 7 in communication with various components of the system 5, to both receive and to transmit control signals to and from pressure transducers, electronic valves, hydraulic pump 12, and so forth.

Figure 4:
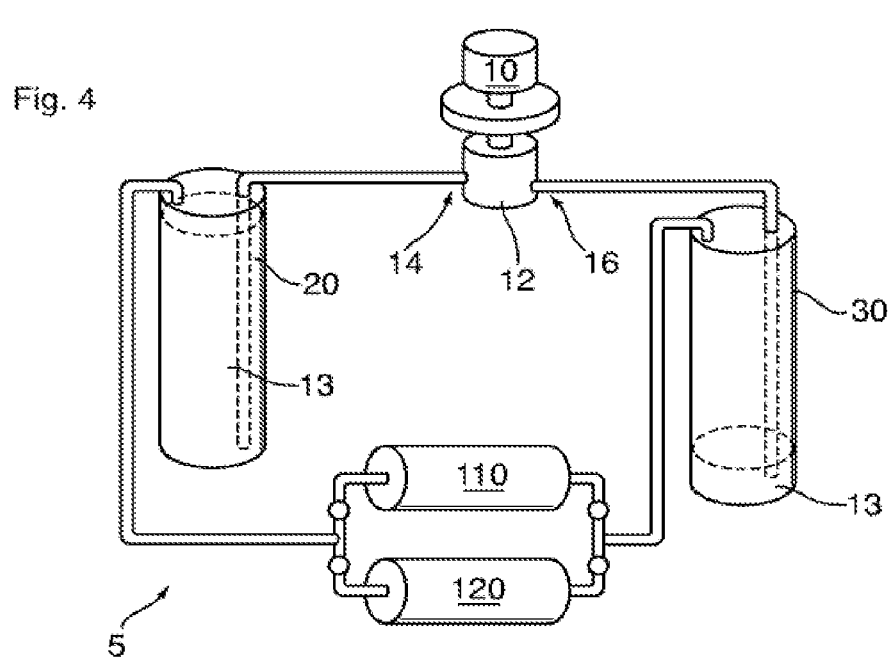
FIG. 4 is a schematic diagram showing components of the system of FIG. 1 during compression of gas for storing energy in which a compression/expansion vessel has a maximum amount of hydraulic fluid therewithin and another compression/expansion vessel has a minimum amount of hydraulic fluid therewithin.

The general operation of system 5 for storing and releasing energy will now be described with reference to FIGS. 4, 5 and 6.

Figure 5:
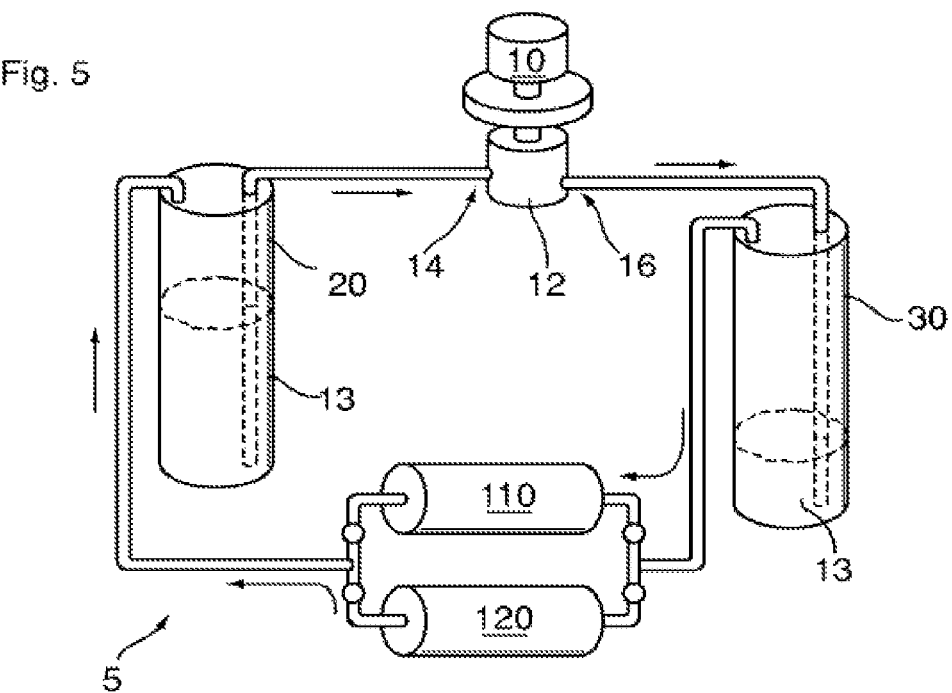
FIG. 5 is a schematic diagram showing components of the system of FIG. 1 during compression of gas for storing energy in which both compression/expansion vessels have more than the minimum and less than the maximum amounts of hydraulic fluid therein.
Figure 6:
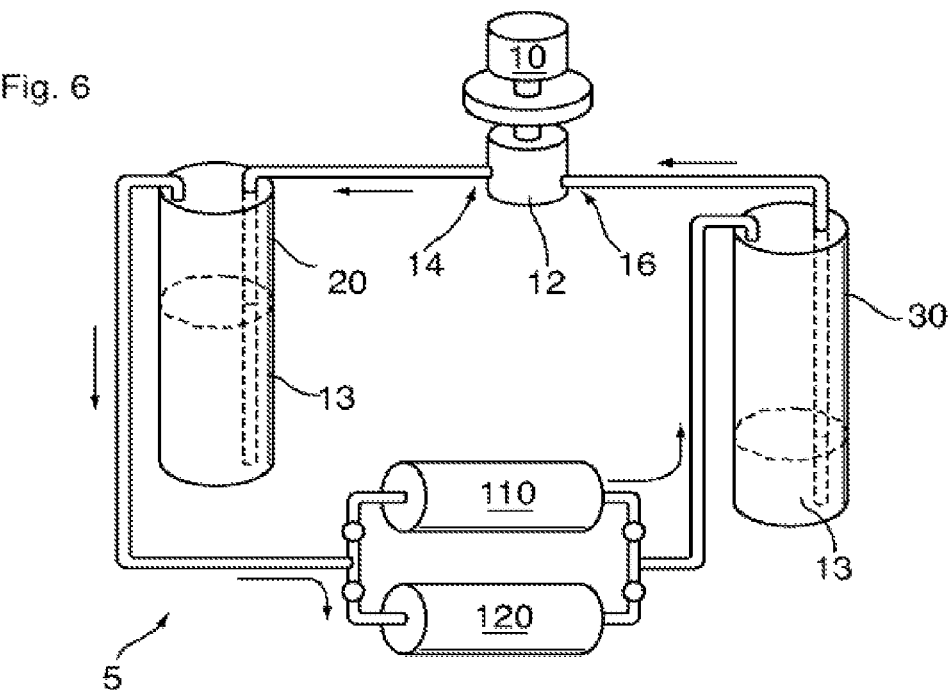
FIG. 6 is a schematic diagram showing components of the system of FIG. 1 during expansion of gas for releasing energy in which both compression/expansion vessels have more than the minimum and less than the maximum amounts of hydraulic fluid therein.

FIG. 5 is a schematic diagram of components of system 5, when in an initial state. As shown, compression/expansion vessel 20 is at a maximum level of hydraulic fluid 13, and compression/expansion vessel 30 is at a minimum level of hydraulic fluid 13. In this state, the control subsystem 7 has provided signals such that FLPcV 122 is open, FHPcV 112 is closed, SLPcV 124 is closed, and SHPcV 114 is open.

Control subsystem 7 provides signals such that the hydraulic pump 12 is operating as a pump with the flow of hydraulic fluid 13 moving from first port 14 to second port 16. IN this condition, generator/motor 10 is driving the hydraulic pump 12, as is shown in FIG. 6. As generator/motor 10 rotates the hydraulic pump 12, hydraulic fluid 13 is pumped from first port 14 to second port 16, overcoming a pressure difference Δp between the high pressure gas storage chamber 110 and the low pressure gas storage chamber 120. The electrical energy driving the generator/motor 10 is thereby being converted and stored as potential energy by virtue of the gas pressure differential between the gas storage chambers 110, 120.

At any moment in this cycle when the level of the liquid in the first compression/expansion vessel 20 is less than a maximum level, and the level of the liquid in the second compression/expansion vessel 30 is greater than a minimum level, as gauged by respective fluid level transducers, the system 5 can be changed in state from energy storing to energy releasing. This can be achieved by reversing the direction of flow of hydraulic fluid 13 within the hydraulic pump 12, and allowing the hydraulic fluid 13 to impart force to the hydraulic pump 12 so as to rotate its shaft and drive the generator/motor 10, as shown in FIG. 5.

Because hydraulic pump 12 has an "over the center" configuration, reversing the direction of flow does not change the direction of rotation of the shaft of the hydraulic pump 12. As a result, the angular momentum is not significantly perturbed. The settling/transition time for the "over the center" pump to perform this reversal could be on the order of 0.1 second, and during this settling/transition time the angular momentum of the flywheel 18 maintains rotation at a nearly constant angular velocity.

For a change in state from energy storing to energy releasing, the generator/motor 10 now operates as a generator, and as electricity produced by the generator/motor 10 is used by an electrical load, the generator/motor 10 provides back torque that resists the rotation of the hydraulic pump 12 and absorbs the mechanical energy being generated from the hydraulic pump 12 (which is, at this point, acting as a motor driven by the gas pressure differential.

It will appreciated that, while system 5 is capable of switching from storing to releasing in the middle of a cycle (i.e., middle being "not at the end") as described above, switching does not have to occur mid-cycle. When switching from energy storage to energy retrieval, or from retrieval to storage in general the fluid flow directions will be reversed (i.e. from left to right, to right to left, or vice versa), and the hydraulic pump 12 will switch from pumping to being driven (or being driven to pumping) during the same transitional time as the electrical generator/motor 10 switches from motor to generator (or generator to motor).

If storing during left to right flow of hydraulic fluid through hydraulic pump 12 were to continue instead of being interrupted as described above for retrieval, the current "stroke" would end when the level of hydraulic fluid 13 in the first compression/expansion vessel 20 reached at a minimum level, corresponding to level of hydraulic fluid 13 in the second compression/expansion vessel 30 reaching a maximum level, as determined using, in this embodiment, the fluid level transducers. At the end of this stroke the storing could continue upon occurrence of a different transition. As a backup for the fluid level transducers, pressure and temperature sensors can be used for redundancy.

For the transition, the hydraulic pump 12 would be controlled by control subsystem 7 to reverse the direction of flow of the hydraulic fluid 13 through the hydraulic pump 12. Furthermore, as described above the shaft of the hydraulic pump 12 would continue to rotate in the same direction due to its over-the-centre configuration, and during this flow direction change the flywheel 18 would smooth the angular momentum of the shaft of the hydraulic pump 12. However, the states of valves 112, 114, 122, 124 would be carefully reversed.

Prior to reversal, however, those of gas valves 112, 114, 122, 124 that are open at the time of transition to the subsequent power stroke would be closed by control subsystem 7. With all such previously-open gas valves having been closed, SLPcV 124 would then be opened. Since at this point there would be no gas within the second compression/expansion vessel 30 (due to the hydraulic fluid 13 being at a maximum level within that vessel) at that time, little or no gas would flow but the pressure would thereby be permitted to equilibrate between the hydraulic liquid 13, and the gas in the low pressure gas storage chamber 120.

As the generator/motor 10 provides power to the re-engaged but reversed hydraulic pump 12, the hydraulic pump moves hydraulic fluid 13 from the second compression/expansion vessel 30 to the first compression/expansion vessel 20, thereby compressing the gas therein. When the gas pressure in the first compression/expansion vessel 20 generally reaches equilibrium with the gas pressure in the high pressure gas storage chamber 110, as determined by the control system 7 responsive to signals from pressure transducers as described above, the FHPcV 112 is opened.

When the level of the hydraulic liquid 13 is again effectively at its minimum in the second compression/expansion vessel 30 and accordingly the level of the hydraulic liquid 13 in the first compression/expansion vessel 20 is effectively full, then the cycle reverses again. During this reversal to effect another storing stroke, the hydraulic pump 12 is again caused selected by the control subsystem 7 to change direction of flow of hydraulic fluid 13, so that flow from pump port 14 to pump port 16 changes to flow from pump port 16 to pump port 14. Again, the flywheel 18 maintains the rotation of the generator/motor 10 and the hydraulic pump 12. The control subsystem 7 also closes each of FHPcV 112, SHPcV 114, FLPcV 122 and SLPcV 124.

At this point, the control subsystem 7 opens FLPcV 122 to put first compression/expansion vessel 20 in fluid communication with the low pressure gas storage chamber 120, and flow of hydraulic fluid 13 from pump port 14 to pump port 16 is commenced. When enough compression has been achieved so that pressure is almost in equilibrium between the second compression/expansion vessel 30 and the high pressure gas storage chamber 110, the SHPcV 114 is opened to put high pressure gas storage chamber 110 in fluid communication with the second compression/expansion vessel 30.

In the event that a retrieval cycle were to be started at this point, then FHPcV 112 would be opened to put the first compression/expansion vessel 20 in fluid communication with the high pressure gas storage chamber 110, and SLPcV 124 would be opened to put the second compression/expansion vessel 30 in fluid communication with the low pressure gas storage chamber 120.

Various strategies can be employed on retrieval of energy (expansion and discharge of pressurized gas), one of which is to leave FHPcV 112 open just until the proportion of hydraulic fluid 13 in the first compression/expansion vessel 20 matches the ratio of the gas pressure in the low pressure gas storage chamber 120 to the gas pressure in the high pressure gas storage chamber 110. Regardless of the exact moment chosen to cycle the high pressure gas valve (or the high and low pressure valves) the next "stroke" in retrieval would begin when liquid level in the first compression/expansion vessel 20 had reached its minimum, and when the liquid level in the second compression/expansion vessel 30 had reached its maximum. At that point, all of the gas valves would be closed.

However, the next stroke would begin with a command to the hydraulic pump 12 to reverse fluid flow so that the next stroke would commence with fluid flow from pump port 16 to pump port 14, with the hydraulic pump 12 acting as a motor, and the electrical generator/motor 10 acting as a generator. The SLPcV 124 would be opened to thereby enabling fluid communication between the low pressure gas storage chamber 120 and the second compression/expansion vessel 30. Also, the SHPcV 114 would be opened so that differential in the gas pressures would continue to drive the fluid, but in this stroke the drive would be from the pump port 16 to the pump port 14. The moment of closure for the valve connecting the high pressure gas storage chamber 110 to the second compression/expansion vessel 30 would correspond to the proportion of levels of hydraulic fluid matching the proportion of gas pressures, as similarly described above.

Figure 7:
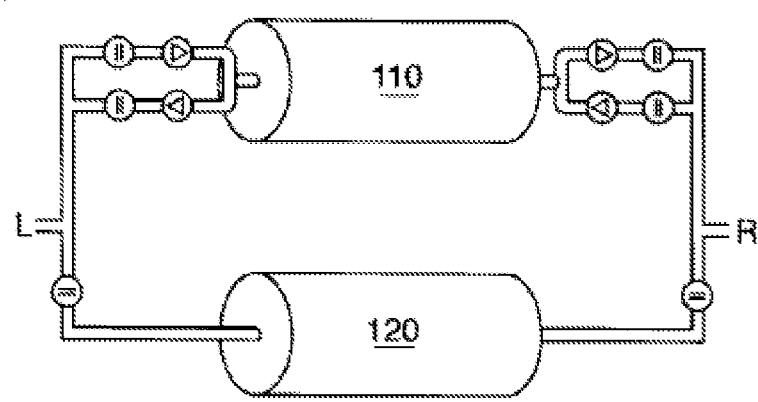
FIG. 7 is a schematic diagram of an alternative embodiment of a gas storage subsystem.

FIG. 7 is a schematic diagram of an alternative embodiment in which valves between the gas storage subsystem and the compression/expansion vessels can in fact be "doubled" so that lockstep timing of the opening and closing of the valves is not as critical. In this alternative embodiment, a uni-directional poppet valve will only allow the gas to escape from the vessel under compression when the pressure in the compression vessel equals or slightly exceeds that in the high pressure gas chamber. In fact "doubling" of the gas valves is necessary if the electronically controlled valves are uni-directional by design. If the valves are "doubled" then a reversal between storage and retrieval of energy also requires a reversal of which of the pair of valves is electronically selected.

The above storing/retrieval process can be applied successfully if the hydraulic liquid is an ionic liquid (or a hydraulic liquid that similarly absorbs no gas so that the phenomenon of cavitation cannot happen), or if the pressure differences between the low and high pressure gas storage chambers are maintained at a small ratio, such as 3 or 5.

One problem with restricting the pressure ratios is that the energy density which can be achieved is restricted to a small percentage of what could be possible given the sizes of the chambers. One problem with the use of ionic liquids is they are quite expensive—on the order of about 500 times more expensive than mineral oil.

In order to address the problem of expensive ionic liquids, one could employ a less expensive liquid such as KRYTOX—a fluorinated vacuum pump oil with a density of 2.1 formulated to be non-reactive with oxygen—for the bulk of the liquid, but to also float a small guard layer of true ionic liquid (with a higher density such as 1.4) on top of the KRYTOX to protect the gas/liquid interface. However, the liquid levels would have to be controlled such that the ionic liquid remained entirely within the compression/expansion vessels 20, 30 and was not drained into the hydraulic pump 12. As a result, the strokes would be controlled to be shorter.

If mineral oil were chosen then the pressure regimes would need to be restricted to small ratios like 3 or 5, and the gas in compression/expansion vessels 20, 30 would then have to be chosen carefully to ensure no reactive or explosive mixtures occur. Nitrogen might be chosen, for example. On the other hand, if ionic liquid (like EMIM TFSI) or KRYTOX with an ionic cap layer were used, then the gas within the compression expansion vessels 20, 30 could be air.

Figure 8:
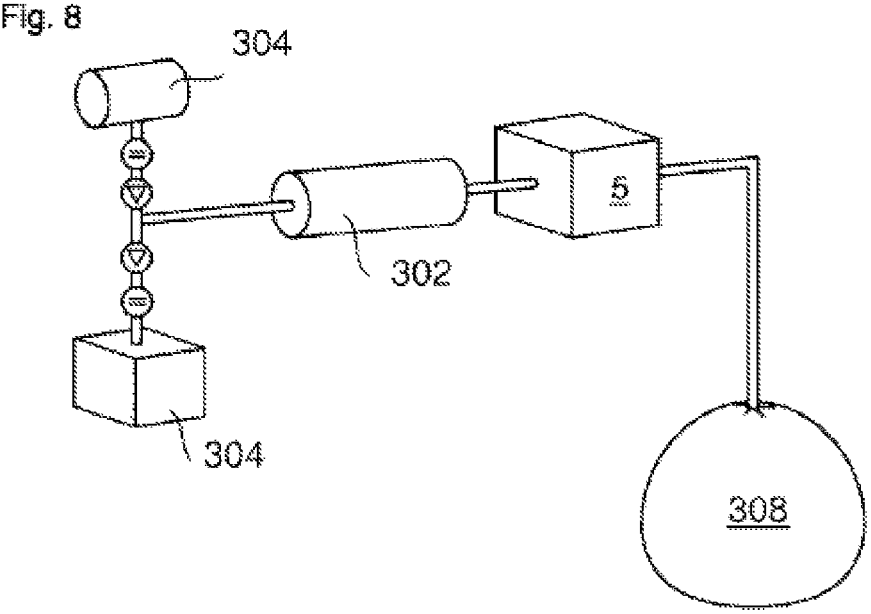
FIG. 8 is an alternative embodiment of a system for storing and retrieving energy using compressed gas.

If air is used in the compression expansion vessels 20, 30 and the operating or maximum pressures are chosen such that the high pressure gas storage chamber 110 holds up to 5000 psi or greater, then it is possible to use a "single" reservoir system with two adjunct pieces of hardware: a screw or other mechanical compressor to "pre-charge" or fill a low pressure gas storage chamber prior to the final low ratio compression with liquid pistons, and an air engine to discharge excess expanded air back to atmospheric pressure. The low pressure gas storage chamber would be maintained as a working reservoir at a pressure of between 300 psi and 1000 psi, for example. This would allow conventional (but inefficient) compressors to be correctly sized to gather the large volumes of low pressure (less than 1000 psi) air used for the final low ratio but high energy compression. An alternative embodiment having this configuration is shown in FIG. 8. With this configuration, 80 percent of the energy storage/retrieval action would occur in compressing the air in the buffer (low pressure) reservoir 302 to its final pressure of 5000 psi. Since efficiencies are high with use of a quasi-isothermal liquid piston compressor described above, efficiencies of that process can be expected to be over 80 percent. Efficiencies expected from either conventional compression 304 into the buffer reservoir, or expansion through an air engine 306 are expected to be in the range of 30 percent (comparable to conventional compressed air energy storage, or CAES) but the high losses would be confined to the 20 percent of energy available in the "low pressure" compression expansion between 1 atmosphere and 60 atmospheres, so that the total loss is limited to 30 percent (total efficiency of about 70 percent).

Of this 30 percent loss, 14 percent comes from the low pressure portion of the process (70 percent of 20 percent), and the remaining 16 percent (representing 20 percent of the 80 percent) from the high pressure cycle. This still allows for very high overall energy storage/retrieval efficiencies, with only one large reservoir 308 required as the site of energy storage.

Such a single large reservoir 308 may conveniently be implemented as an assembly of steel tubes, or preferably as carbon fiber composite structures. Where suitable, it can be even more effective as a geological reservoir (either a salt dome, or even a depleted oil well) having a large enough capacity to store significant amounts of potential energy in the form of pressurized gas. Geological reservoirs offer the possibility of storing 100's of megawatt hours and thereby buffering significant wind or solar energy installations. Carbon fiber composite structures, or steel tubes are currently less economical, but may prove effective in providing energy storage at remote sites, or in portable vehicles.

The use of liquid pistons for compression of gases is a very active area of current technical development. An approach is disclosed herein for isolating or restricting the absorption of gases by the hydraulic liquid, or of effecting solubility reduction of the gas within the hydraulic liquid and particular apparatuses.

United States Patent Application Publication No. 2007/0258828 A1 (Adler et al.) discloses the importance of avoiding gas absorption within a liquid piston compressor and a solution that consists of the use of liquids which do not absorb gases. The particular liquids proposed are ionic liquids. However, ionic liquids with gas solubility of less than $10^{-4}$ mol/l bar available such as TFSI (trifluoromethanesulfonimide) based ionic liquids including [EMIN/1][TFSI] or [BMIM] [TFSI] are very costly.

U.S. Pat. No. 5,021,125 (Phillip et al.) discusses means of dealing with gas absorption in hydraulic liquids associated with the very large piston-less accumulators which might be used in pulp mills by means of allowing gravimetric separation of gas rich liquid by means of laminar flows through long vertical tubes. This requires very large physical structures, and despite the great cost, is only marginally effective.

PCT Application No. PCT/US2010/035795 (Aborn et al.) proposes a solution comprised of inserting into the compression columns structures with umbrella like "caps" to catch gas bubbles. The required structure is complex, and it efficacy is not proven.

U.S. patent application Ser. No. 12/813,781, and PCT Application No. PCT/CA2008/002178 (both the Kenway et al.) discloses the use of two devices the first of an isolation piston shuttle (with appropriate commutation valves) where a solid metal piston separates the liquid and the gas (in a device resembling a hydraulic intensifier). The first does not directly relate to a liquid piston compressor, but does relate to "piston-less" accumulators. The second is of the use of low absorption liquids like compressor fluid EXXCOLUB, or of the use a floating layer of "light oil impervious to gas" floating on top of the hydraulic fluid.

U.S. Pat. No. 7,802,426 (Bollinger) teaches that although a liquid may be used to "drive" a piston in a compressor, that separation should be maintained between the liquid and the gas by means of a solid piston. This approach precludes many of the thermodynamic advantages that arise from having the liquid in direct contact with the gas.

Gas absorption in hydraulic fluids is sought to be minimized (or gas soluble liquids must be isolated from high pressure gases) because of the phenomenon of cavitation in hydraulic systems. In the publication entitled "Cavitation Wear in Hydraulic Systems" (http://www.machinerylubrication.com/Read/380/cavitation-wear-hydraulic), E. C. Fitch teaches:

"The phenomenon of cavitation consists in the disruption of continuity in the liquid where there is considerable local reduction of pressure. The formation of bubbles within liquids (cavitation) begins even in the presence of positive pressures that are equal to or close to the pressure of saturated vapour of the fluid at the given temperature . . . . The mechanism of cavitation can be described as follows: Any liquid will contain either gaseous or vaporous bubbles, which serve as the cavitation nuclei. When the pressure is reduced to a certain level, bubbles become the repository of vapour or of dissolved eases. The immediate result of this condition is that the bubbles increase rapidly in size . . . . It is believed that reduction in volumetric stability in most liquids is associated with the contents of various admixtures, such as solid unwetted particles and gas-vapour bubbles, particularly those on a submicroscopic level, which serve as cavitation nuclei. A critical aspect of the cavitation wear process is surface destruction and material displacement caused by high relative motions between a surface and the exposed fluid. As a result of such motions, the local pressure of the fluid is reduced . . . . When the pressure returns to normal (which is higher than the vapour pressure of the fluid), implosions occur causing the cavity or vapour bubbles to collapse. This collapse of bubbles generates shock waves that produce high impact forces on adjacent metal surfaces and cause work hardening, fatigue and cavitation pits. Thus, cavitation is the name given to a mechanism in which vapour bubbles (or cavities) in a fluid grow and collapse due to local pressure fluctuations."

The above citation of the E. C. Fitch publication does not emphasise temperature effects since it considers both absorbed gases as well as vapours of the hydraulic liquid. In the case of vapours, pressure changes in the overall hydraulic liquid arising from local surface flows may cause a phase change and complete collapse of the "bubble". In the case of absorbed gases the mechanism may be significantly different relating to drastic temperature changes locally at the bubble, or even explosion of a bubble as the result of local combustion (if the bubble contains air, oxygen or a reactive gas). Since some liquid piston compressor/expander designs depend upon hydraulic pumps, or motors or valves to control and move the hydraulic liquid, minimizing absorption of gas and increasing the isolation between gas and hydraulic liquids in which the gas is soluble, is an important consideration.

Embodiments of liquid pistons are considered herein.

The use of a two liquid buffered process employs one liquid for the liquid piston and a second liquid for the operation for the hydraulic pump 12. The first liquid may be, for example, ethylene glycol/water/inhibitor based coolant for the compression of reactive gases since this liquid does not freeze or boil easily, and is also non-flammable and therefore does not produce an explosive mixture in combination with air). The second liquid may be, for example, hydraulic oil. The two liquids are separated by an isolator piston (of solid material), such that the liquid piston liquid never passes through components likely to produce cavitation.

Figure 16:
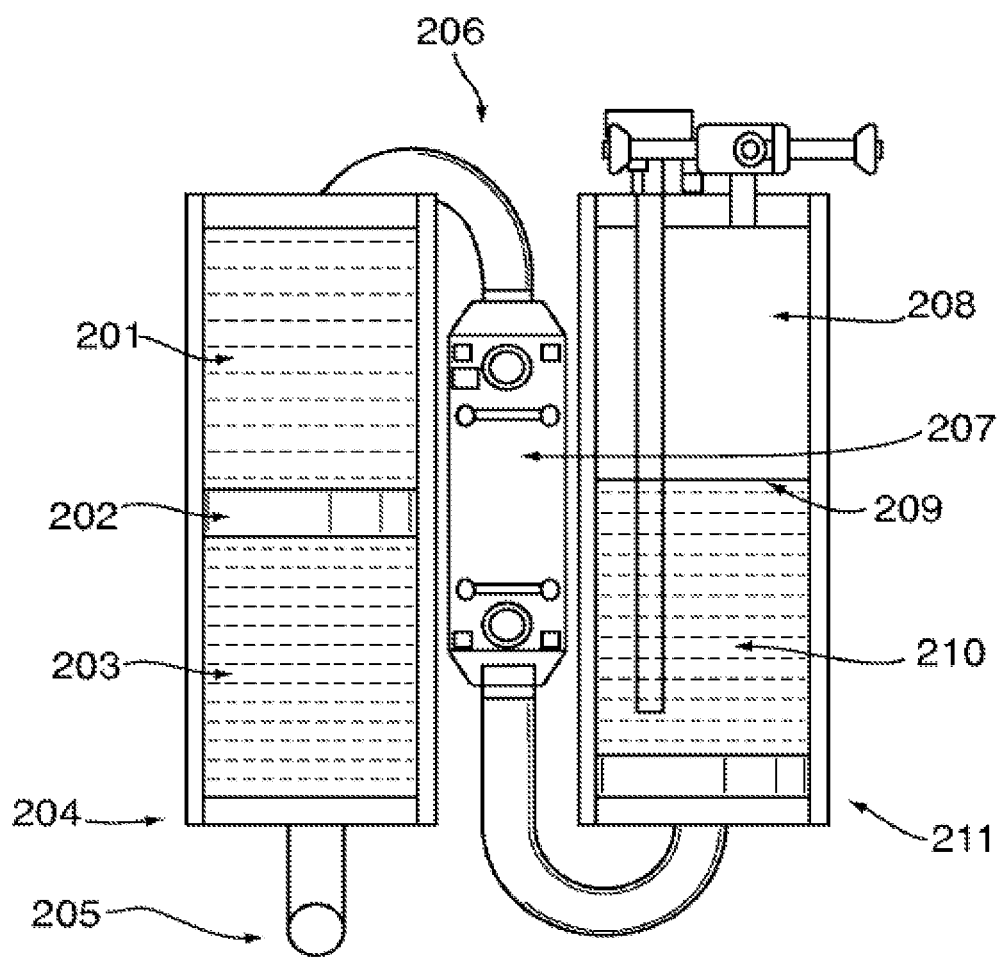
FIG. 16 shows a compression/expansion vessel in cooperation with an isolation cylinder for a two-liquid buffered configuration.

A two liquid system employing a buffer is shown in FIG. 16. Such an apparatus is preferably configured so that the heavier liquid is always "under" the lighter liquid. As such, even if the two liquids leak past their seals, their basic order is maintained. Since the "compression liquid" 203 is used for heat exchange it passes down through pipe 205 which rises behind the isolation cylinder 204 and through 206 an external high pressure shell and tube heat exchanger 207 on its way from the compression/expansion chamber 211. The buffer piston chamber liquid 203 is the same as liquid 210 and it is this liquid which passes through the internal heat exchange mesh inside the compression/expansion chamber. Liquid 201 is the lighter (less dense) hydraulic oil which actually flows in and out of the conventional hydraulic pumps motors and valves. It has no contact with the gas, and is buffered by solid piston 202.

Figure 17:
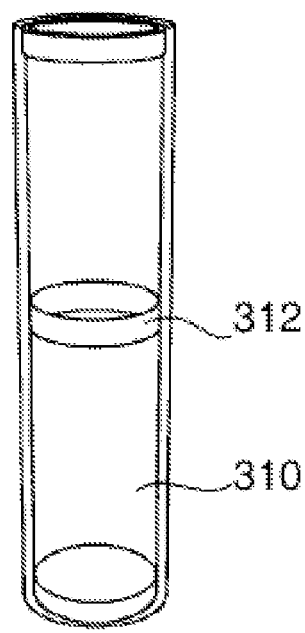
FIG. 17 shows a compression/expansion vessel with two layers of liquid therein for a two-liquid un-buffered configuration.

A two liquid system without a buffer is shown in FIG. 17. This system employs a primary liquid 310 that is a dense and non-reactive liquid like DuPont KRYTOX™ vacuum pump fluids, Dupont KRYTOX NRT™ series oils, or halo-carbon oils with density approximately 1.9 gm/cc. The buffer liquid 312 is a liquid with extremely low gas solubility such as ionic liquid GEMIM][BTA], [BMIM][BTA], or [BMMIM][BTA] for example, having a density of approximately 1.5 gm/cc. Since the buffer liquid 312 floats on the primary liquid 310 and since only the primary liquid 310 will pass through the pump (or out of the compression/expansion chamber) the buffer cap will remain floating. Furthermore, since the ionic liquid has a low viscosity, it will easily pass through internal heat exchange structures within the liquid piston compression/expansion chamber.

The two liquid system without a buffer is significantly simpler since it does not have a buffering cylinder is unnecessary. As discussed above, the fluid levels must be controlled so that the KRYTOX or halo-carbon oil is never drained from the compression/expansion vessel. This is because, at this time, it is not clear that the gravimetric density separation which maintains the floating isolation buffer will be recoverable if the lighter ionic liquid is distributed through the cavities of the hydraulic valves, pumps, and motors in the conventional hydraulic part of the system.

Figure 18:
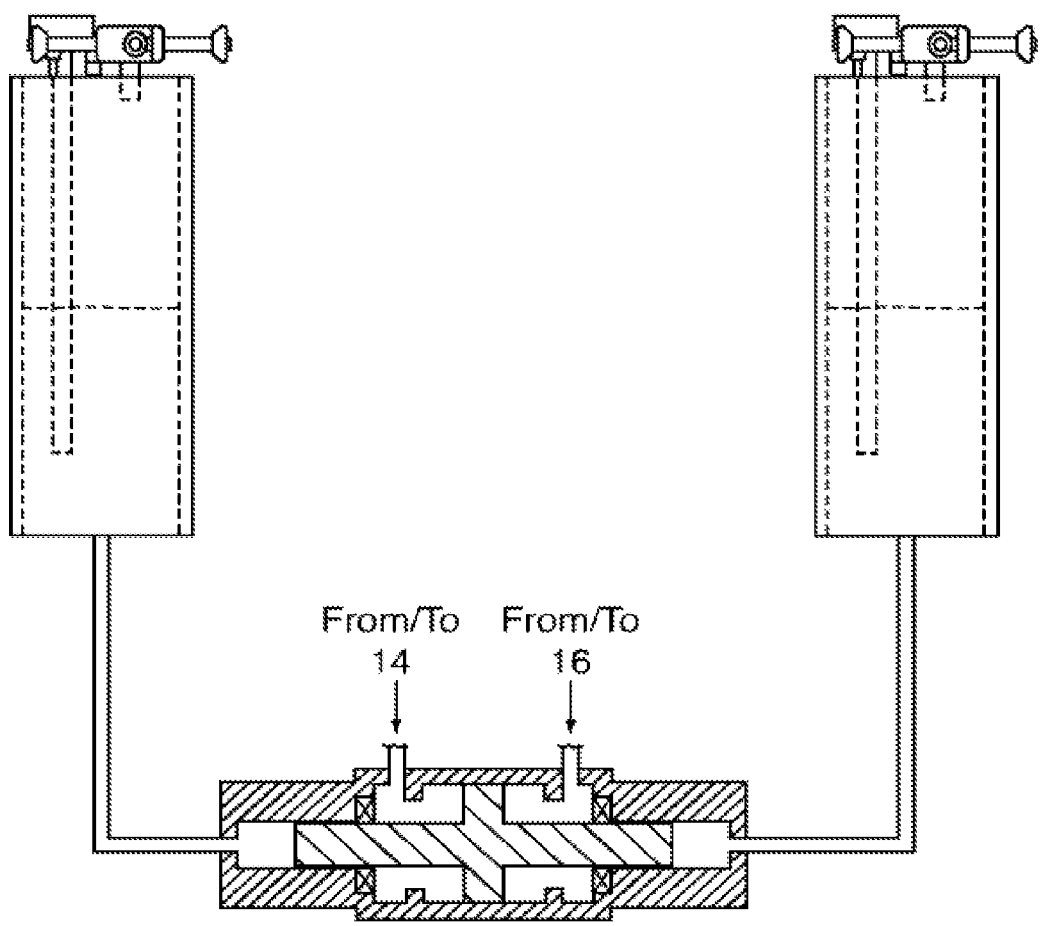
FIG. 18 shows two compression/expansion vessels for an alternative embodiment of a two-liquid buffered configuration with a solid piston.

A system that employs a solid piston to isolate the first and second ports 14, 16 of the hydraulic pump is shown in FIG. 18. This embodiment is very similar to the buffered "two liquid" system shown in FIG. 16. However, in the embodiment shown in FIG. 18, the two isolation pistons are replaced by a single structure that accepts the first and second pump ports 14, 16 of a conventional hydraulic pump/motor (for example an axial piston variable displacement over the center pump/motor like the Linde HPW280) and connects pump ports 14, 16 to the central two annular chambers of a structure resembling a hydraulic intensifier. The purpose of this is two fold: first, to isolate the hydraulic liquid passing through the motor pump from the liquid acting as the liquid piston, and second, to nullify any "offset pressure" or charge pressure. Many hydraulic components require charge pressure. If a hydraulic motor or pump requires charge pressure, then pressure at the pump ports 14, 16 cannot drop below the charge pressure. Since the pressures in a compression/expansion apparatus involving liquid pistons MAY drop below an arbitrary pressure level for charge (say 300 PSI) an isolator like the one disclosed above is necessary. If pump ports 14, 16 are both connected to the center two annular chambers of an intensifier structure, and the two cylindrical volumes comprising the end chambers of the intensifier are each connected to the actual liquid piston compression/expansion chambers, and the volume of each of the end cylinders in the intensifier is approximately the same as the volume of each of the compression/expansion chambers, then the two liquids will be isolated (to minimize the absorption of gases) AND the charge pressure will be nullified so that only the differential pressure between pump ports 14 and 16 will drive the compression/expansion liquid and the compression/expansion process.

In an alternative embodiment, a cluster of parallel intensifier structures may be connected in parallel each with a volume smaller than the compression/expansion chamber volume, but which in aggregate exceed the compression/expansion chamber volume. If for example 4 intensifier structures were used, each with an intensification ratio of 1, then each could be chosen to have a volume slightly greater than one quarter (¼) of the compression/expansion chamber volume.

Alternatively, within the cluster by appropriate piping connection, the direction of motion of the solid pistons may be alternated, so that the acceleration of pistons produces reduced total forces and moments on the mechanical structure and supports.

Alternatively, a real intensification ratio may be incorporated in the intensifier so that higher pressure hydraulics can be used with lower pressure gases, or vice-versa (e.g. 5:1 intensification for 5000 PSI oil to compress/expand 1000 PSI gas).

For the above-described system in which energy may be delivered to or drawn from the generator/motor 10, electrical power conditioning circuitry is provided. That is, in order for electrical power to be delivered under control to the generator/motor 10 (i.e., the electrical prime mover) circuitry containing elements of a variable frequency drive (VFD) is connected between the source of electrical power (the mains or power grid) and the generator/motor itself. It will be understood that VFDs are, in general, well-known.

For example, synthesizing of alternating current (AC) waveforms is discussed in U.S. Pat. No. 3,947,736 (Byers et al.), controlling of slip within AC induction motors by use of these synthetic drive waveforms is discussed in U.S. Pat. No. 4,286,203 (Ehret), use of Pulse Width Modulation (PWM) to switch the basic units of current and voltage to the motor is discussed in U.S. Pat. No. 3,971,972 (Stitch), the use of silicon-controlled rectifiers (SCRs) or Thyristors as a more effective switching element is discussed in U.S. Pat. No. 4,128,793 (Stitch), and the consideration of using all three phases (in both direct and inverted configurations) to provide a controllable source of voltage and current for complete synthesis by PWM is discussed in U.S. Pat. No. 4,618,810 (Hagerman et al.).

Furthermore, U.S. Pat. No. 4,364,037 to Becke et al. discussed the insulated-gate bipolar transistor (IGBT) which simplified the devices required to switch power. Bose et al. further discuss the principles required to use these devices in the smooth control of electrical machines.

Although the prime mover which is part of the disclosed embodiment of is not an induction motor, close control is still important. The control of a synchronous generator operated as a synchronous motor requires modifications to the strategies that govern conventional use of VFD's normally employed to control AC induction motors.

When used as a synchronous motor both more extreme filtering against harmonics and feedback control recognizing the slow acceleration required for a synchronous motor are employed to "start" the generator. The excitation current typically has to be applied as an AC waveform of a frequency between 40 and 240 Hz in order to use the exciter windings as "a transformer" as the generator is started from an angular speed of zero. At this zero rpm state it is still possible to induce a significant magnetic field in the rotor by means of using the exciter stator winding as the primary of a transformer, and the exciter rotor winding as the secondary which receives the transformed current and rectifies it before that current flows into the main rotor windings of the generator being used as a motor.

The rotor is thus transformed into the equivalent of a multi-pole permanent magnet whose rotational torque is generated by the application of a rotating magnetic field to the stator coils of the generator. Since the magnetic fields and stator current intensities are still high even when then rotor is static or starting, the fields generated by the "VFD" may be applied only as widely separated single half phase pulses as the motor starts to turn. If they are conventionally and continuously applied, the generator (acting as a synchronous motor) may fail to start to turn or else oscillate in a more or less locked position.

The post-IGBT filtering should be both high in inductance and tuned, so that wave forms tend to be smooth. Use of phase controlled rectifiers or IGBT's in the diode bridge can be used to achieve further smoothing. The output tuning can be highly peaked (high Q) with regard to the local mains frequency, since the inverter circuit will be used to deliver "clean" power back to the mains when the system is in retrieval mode.

The initial turning of the generator as a motor should only be commenced when the "over the center" hydraulic pump 12 is in a "neutral" position so it effectively offers no resistive starting torque, (or when the hydraulic pump 12 is actually acting as a motor so it generates "negative" torque and turns the generator/motor 10).

Indeed, since this apparatus is in general reversible, the gas pressure differential may be initially used in an "expander" mode to generate starting torque on the over the center" pump shaft to help start turning the generator shaft as the generator comes up to speed as a motor.

Typically operational speeds will be between 500 and 2000 rpm (e.g. 1800 rpm for a 4 pole 60 Hz generator) as is appropriate for 50 and 60 Hz multi-pole generators. The starting problems that need to be overcome by the special means disclosed above relate to attaining the first few hundred RPM of rotational speed on the shaft via which the generator/motor 10 and the hydraulic pump 12 are coupled.

A brief discussion of the time dependence of the power output, angular velocity, and other features of this invention will follow.

Figure 9:
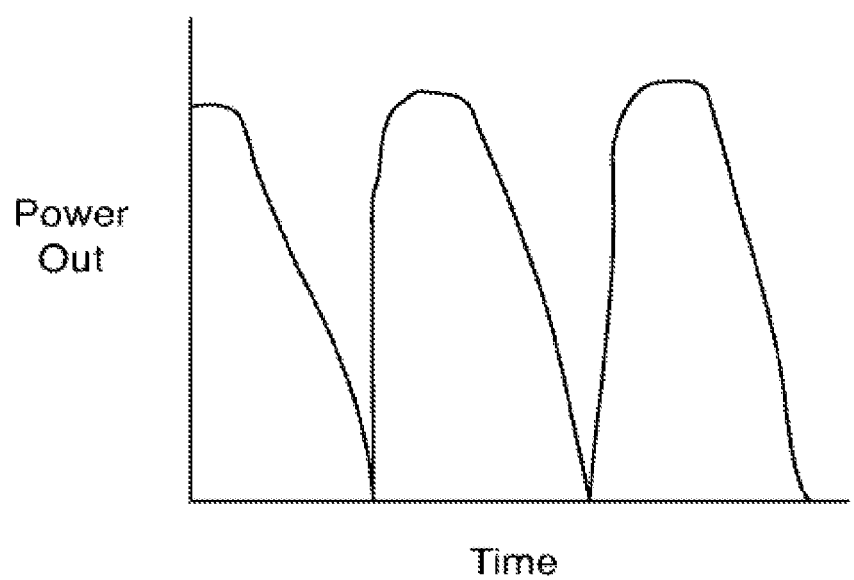
FIG. 9 is a graph showing variation of power output/input of a generator/motor over time.

Within each expansion stroke, the moment when the high pressure gas is initially introduced into a compression/expansion vessel for expansion, is the moment when the maximum amount of power in that expansion stroke is available. Over the course of that expansion stroke the available power decreases. FIG. 9 is a graph showing variation of power output/input of a generator/motor over time. As each stroke completes, the power drops—restarting at its peak value as the flow reverses and a new stroke commences. An inverse cycle describes the storage of energy in the compression cycle. The cycling of power in compression is equally important to regulate; the regulation mechanisms are the same, but used in the inverse.

Because of the use of an "over the center" hydraulic pump 12 as the rotational element coupling the liquid flow into mechanical energy, the rotational direction the pump does not need to change as the cycles reverses. Thus, the angular momentum of the hydraulic pump 12 and the electrical generator/motor of system 5 maintains a rotational speed that varies with the gain and loss of energy through the compression/expansion cycles.

Figure 10:
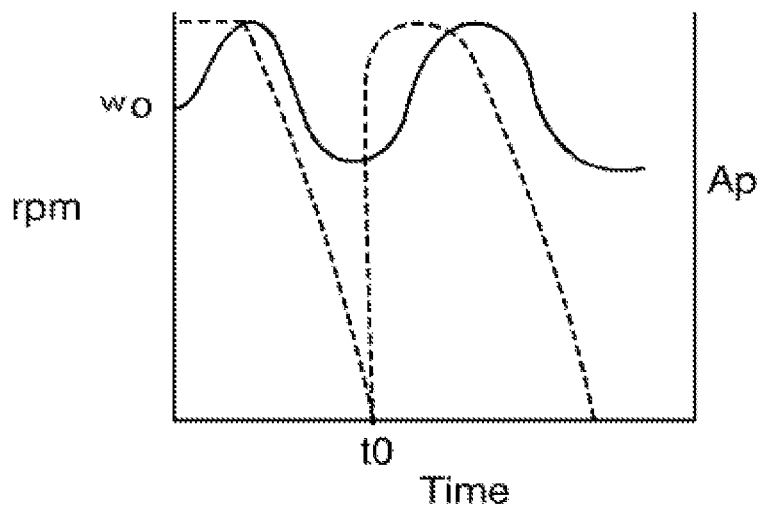
FIG. 10 is a graph showing variation of angular speed of rotation and variation of power output/input of the generator/motor over time.

FIG. 10 is a graph showing variation of angular speed of rotation and variation of power output/input of the generator/motor over time. Since the magnetism within the rotor of generator/motor 10 can be controlled by using the exciter current, it is possible to regulate the rate at which power goes in and out. Modulation of the exciter current peaks as the rotational speed hits its minimum, and dips as the rotational speed hits its maximum. This enables smoothing the power variations within the stroke and cycle.

Figure 11:
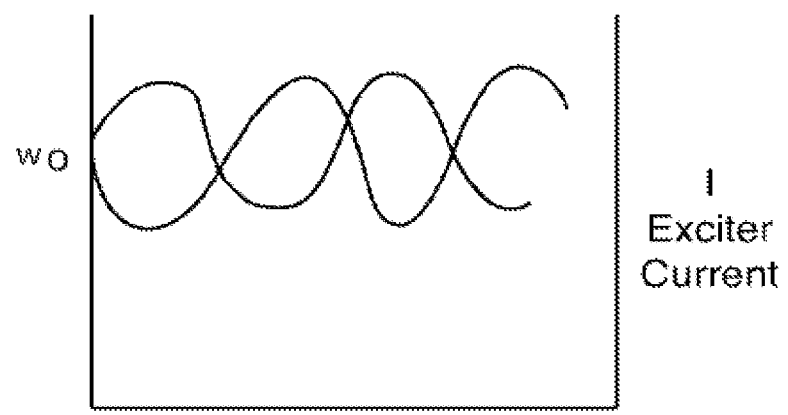
FIG. 11 is a graph showing variation of exciter current of the generator/motor with the variation of angular speed over time for smoothing the power output/input variations.
Figure 12:
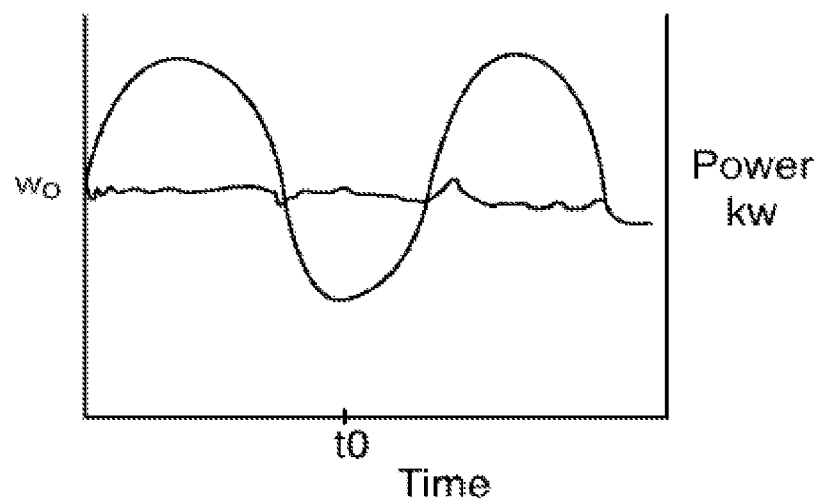
FIG. 12 is a graph showing the resultant variation of power output/input of the generator/motor over time as a result of variation of exciter current as showing in FIG. 11.

FIG. 11 is a graph showing modulation of exciter current of the generator/motor with the variation of angular speed over time for smoothing the power output/input variations. The modulation of this exciter current (or the modulation of a higher frequency carrier (40-200 Hz) which describes the exciter current) provides significant regulation of the power output as shown schematically in FIG. 12, which is a graph showing the resultant variation of power output/input of the generator/motor over time as a result of variation of exciter current.

Figure 13:
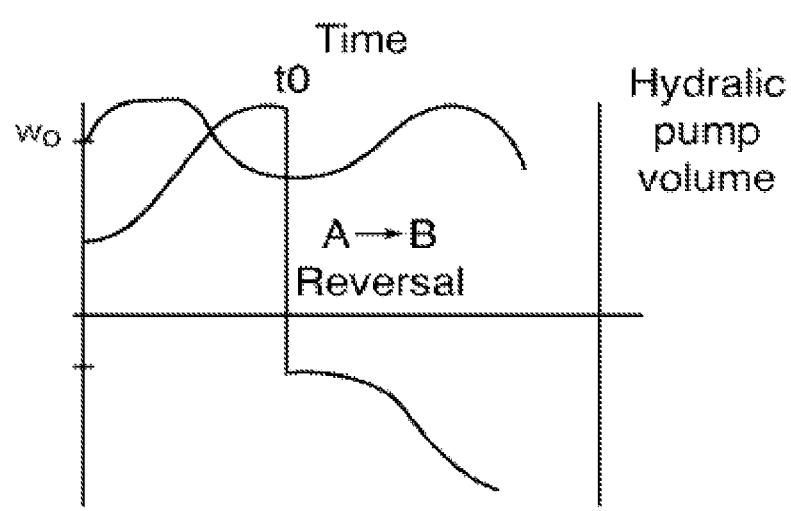
FIG. 13 shows the hydraulic pump volume and flow direction variations with time.

This regulation of power output (or input) is achieved in co-ordination with control changes applied to the volume of the "over the center" hydraulic pump 12. FIG. 13 shows how these control cycles are synchronized.

This change and reversal of volume in the "over-the-center" pump is also an integral part of the current invention. However, there will still be fluctuations in the rotational frequency since the angular momentum of the system (which in this embodiment includes a flywheel 18) is itself part of the energy storage/retrieval system 5 providing short term energy to fill in the voids when the compression/expansion cycle does not offer the possibility of significant energy storage or retrieval.

Compression/expansion cycles times for the system 5 to be employed in common uses are anticipated to be on the order of 30 to 60 seconds.

While the flywheel 18 is intended to provide or absorb energy with a time constant on the order of a few seconds to help smooth out the cycle, variable rotational frequency requires the use of devices similar to VFD's to allow for efficient connection to main or grid power. This is because the rotational speed must vary somewhat from the synchronized motor speeds dictated by grid frequency (typically 50 or 60 Hz)). The electronic components which perform this function allow for isolated rectification of incoming three-phase power, re-synthesis by means of filtering the output waveforms coming from PWM IGBT's into three-phase output power at a different frequency, and the careful switching of that power so it can be delivered from the mains to the prime mover (or in the opposite direction coming from the generator toward the mains with a frequency re-synthesis when power is electrically generated).

According to this embodiment, such circuits are employed to achieve Variable Frequency Drive when the motor/generator 10 is being used as a motor, and the re-use of the same circuit elements to serve as an inverter which re-samples the power produced when the motor/generator 10 is being used as a generator (generating at frequencies which must differ from the mains since angular speed variations are necessary to smooth the power output).

In effect, in retrieval mode, the VFD elements produce electrical output for delivery to electrical mains or grid which is matched in both frequency and phase to the power on the grid. "Bleed" resistors are attached to the three stator windings as the generator is switched between motor and generator function. Although not shown, a separate contactor may be used to disconnect the bleed so that the efficiency loss is limited during continuous operation.

Figure 14:
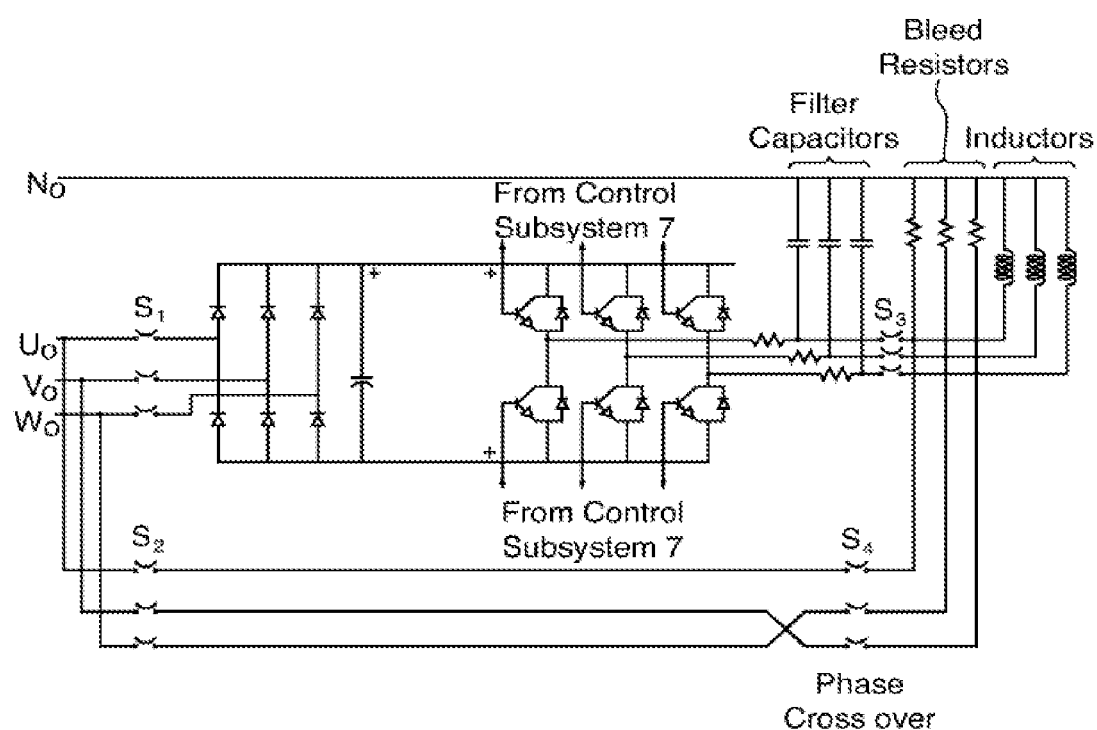
FIG. 14 is a schematic circuit diagram of a circuit for conditioning three phase power being applied to (released via) a generator/motor during storing (retrieving) of energy.

The contactors, diodes, resistors, inductors, filter capacitors and IGBT's shown schematically in FIG. 14 illustrate one embodiment of this double use of the PWM frequency synthesis power control.

In storage mode contactors S1 and S3 would be closed. In retrieval mode S2 and S4 would be closed. The sequence must be "break-before-make" so that the S1/S3 pair is never closed simultaneously with the S2/S4 pair.

In this embodiment, the bleed resistors ensure there is an "escape" path for residual energy, since the generator/motor 10 will typically be continuously turning regardless of the mode system 5 is in. When the contactors are all open, it is also necessary that the exciter current be minimized to avoid excess transients. This co-ordination of exciter current, pump volume, pump direction, gas valves, liquid levels, and IGBT modes is all managed by the control subsystem 7.

The gate leads of the IGBT's are typically connected to a local microcomputer programmed to implement the appropriate starting/stopping, and running PWM strategies, and are controlled and sequenced by the control subsystem 7.

Figure 15:
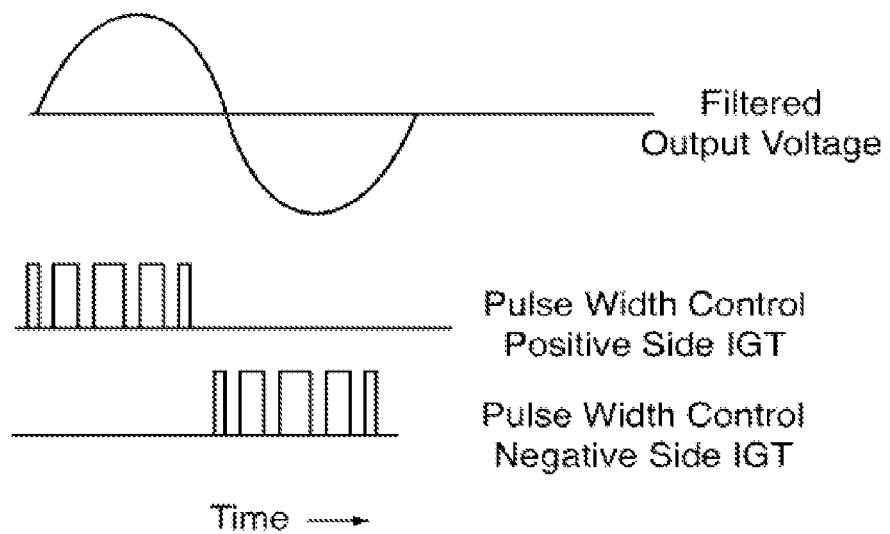
FIG. 15 shows output voltage waveform as a result of filtered pulse width modulation.

These PWM strategies will typically differ from those found in a conventional VFD since most of the application will be within frequency ranges close to (but continuously slightly differing from) the frequency of the electrical mains. Furthermore, it is possible to "tune" the output of the generator (or motor) by choosing an AC exciter frequency which "beats" with the mains frequency and rotational frequencies. The VFD inverter control must exert control of the exciter to produce maximum smoothness in the final output waveform, as shown in FIG. 15. It is intended that starting and stopping of system 5 are rare events, but efficiency and clean synthesis of power are required for the normal operating condition.

Related to the above-described system 5 for energy storage and retrieval is the particular concept of use of such a system 5 in Uninterruptable Power Supplies and the like.

The interruption of power in certain systems can have severe consequences. For example, in a mill during the sawing of a log, power failure may result in the loss of hours of operation time while a log in mid-cut must be manually cut away due to loss of power. Even more critical situations resulting from the loss of power may be experienced in a reactor, or in a hospital.

In applications where interruption should be "moderated" Uninterruptable Power Supplies (UPS) of various configurations are often employed. One fundamental problem with most UPS designs lies in the mechanism for switching between the Primary power source (usually the Mains) and Secondary power sources. The problem is especially acute when multiple transitions are involved. For example, in situations where the Mains (grid) are the primary power source, and a "ride-through" UPS provides 15 seconds to 2 minutes of power until the diesel backup generators are started and stabilized. In such circumstances several transitions are required to traverse the entire sequence and finally recover with the restoration of power to the mains.

The problems that can arise tend to become more severe in power systems where the power level exceeds 100 KW and, such that large amounts of power must be safely "switched". It is highly desirable to develop both processes and apparatus which will allow for even more generally seamless switching between power sources at high power levels when drop-outs or brown-outs occur in the primary AC power source, which is typically the electrical mains.

Figure 19:
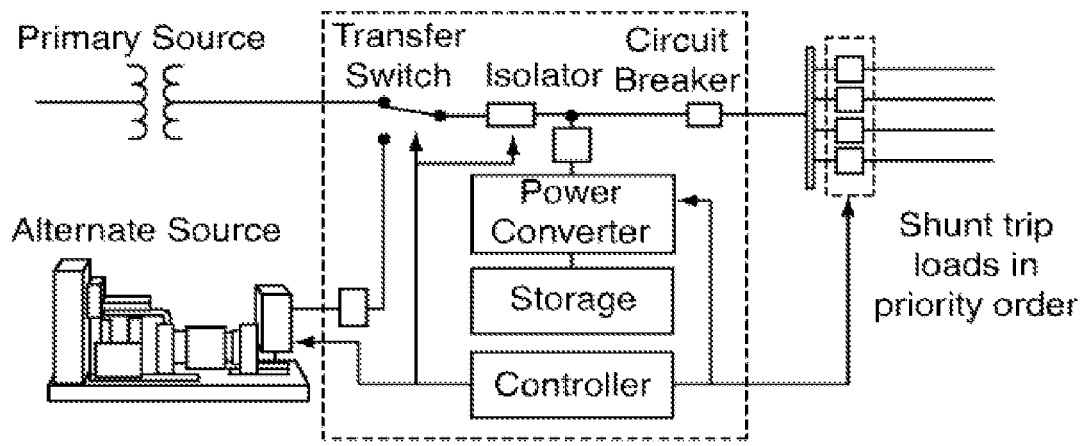
FIG. 19 is a schematic diagram of an uninterruptible power supply.

The basic concepts of back power systems and Uninterruptable Power Supplies are well-known, and main components of one such UPS system are shown in FIG. 19.

The problems leading to non-seamless transitions from primary to secondary power sources tend to be caused because, when used in conjunction with modern "control electronics" like VFDs, the small transitional "glitches" tend to trip out motor controllers, VFD's computers and other critical functions. Although the UPS or back up power systems do provide power "filler", the transitions are difficult to manage and controllers trip, metal vapor lights extinguish, or processes stop in the brief flicker as the backup power "kicks in".

The concept of using high power switching semiconductors to control motors is taught by Byers in U.S. Pat. No. 3,947,736. The control of slip within AC induction motors by use of these synthetic drive waveforms is disclosed by Ehret in U.S. Pat. No. 4,286,203. The use of Pulse Width Modulation (PWM) to switch the basic units of current and voltage to the motor is taught by Stitch in U.S. Pat. No. 3,971,972. Use of SCR's or Thyristors as more effective switching elements is taught by Stitch in U.S. Pat. No. 4,128,793, and the consideration of using all three phases in both direct and inverted configurations to provide a controllable source of voltage and current for complete synthesis by PWM is taught by Hagerman et al. in U.S. Pat. No. 4,618,810.

Furthermore, Becke et al. in U.S. Pat. No. 4,364,037 teach the use of IGBT's, which simplify the devices required to switch power. Bose et al., in the publication entitled Adjustable Speed AC Drive Systems, New York: IEEE Press, ISBN 0-87942-146-0 further teach us principles for using these devices for the smooth control of electrical machines.

Figure 20:
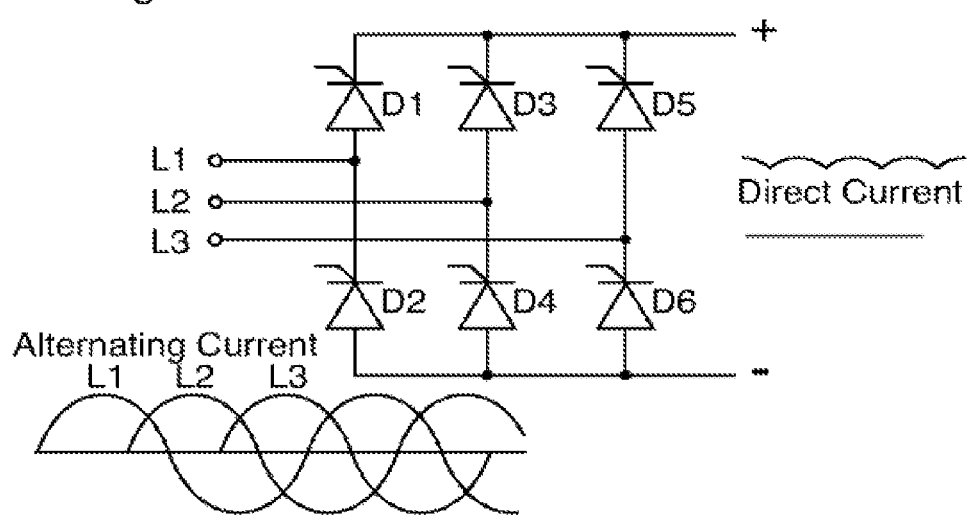
FIG. 20 is a schematic diagram of a rectification stage for the uninterruptible power supply of FIG. 19.

FIG. 20 is a schematic diagram of a rectification stage for the uninterruptible power supply of FIG. 19. The rectifiers shown in FIG. 20 are in fact Silicon Controlled Rectifiers or SCR's. These allow very good control of the charging, but in most applications simple solid state diodes will suffice.

Figure 21:
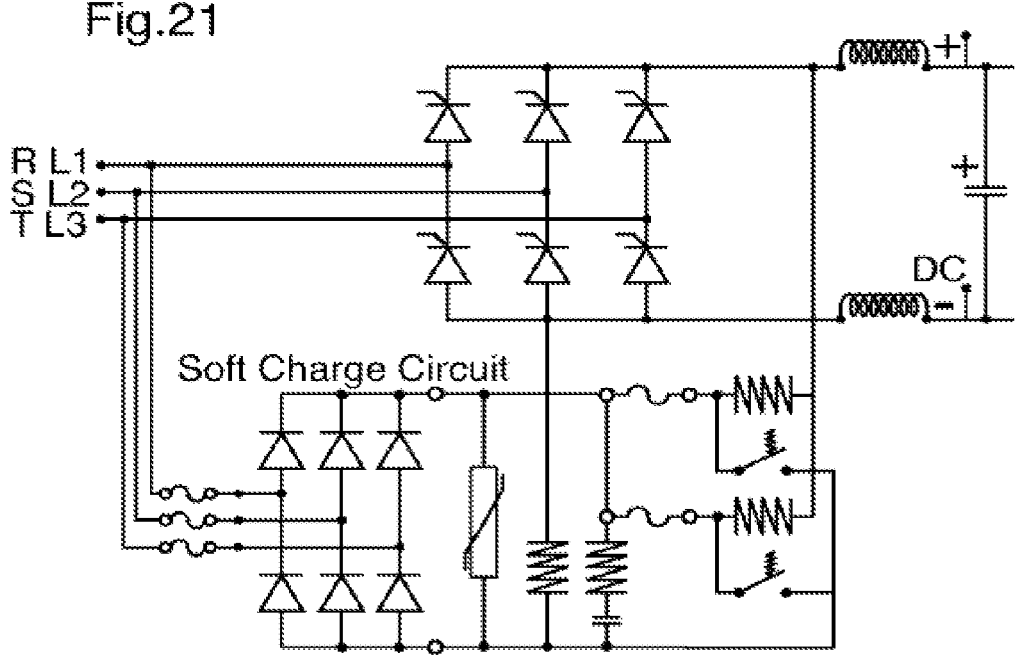
FIG. 21 is a schematic diagram of an alternative rectification stage for the uninterruptible power supply of FIG. 19.

FIG. 21 is a schematic diagram of an alternative rectification stage for the uninterruptible power supply of FIG. 19. The circuit in FIG. 21 is more practical for higher power levels allowing for a controlled charging of a capacitor, which stores the DC and provides the conventional stiffness of the DC bus in the original known designs.

Figure 22:
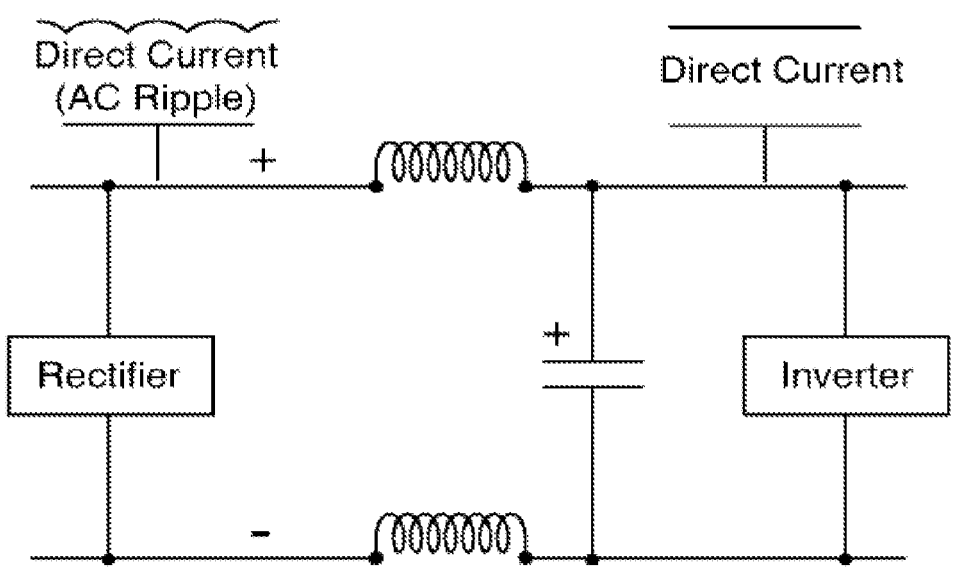
FIG. 22 is a schematic diagram of voltage rectification, smoothing and inverting stages of the uninterruptible power supply of FIG. 19.

FIG. 22 is a schematic diagram of voltage rectification, smoothing and inverting stages of a variation on the uninterruptible power supply of FIG. 19. The appropriate filtering is provided so that the charging circuit produces smooth DC at the capacitor (the capacitor being the defining nodal centre of the DC bus).

Figure 23:
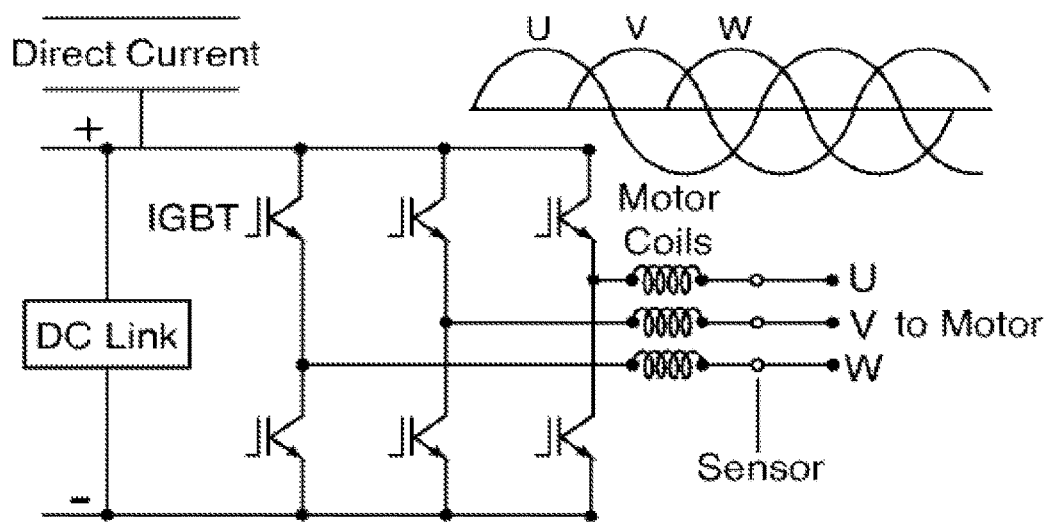
FIG. 23 is a schematic diagram of the output stage of the uninterruptible power supply of FIG. 19.
Figure 24:
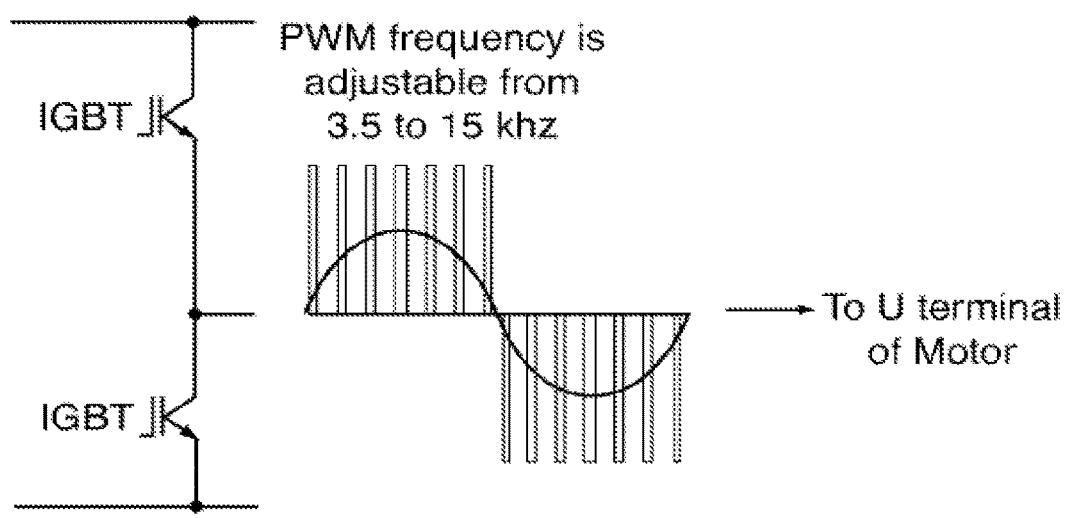
FIG. 24 is a schematic diagram of one of the sets of insulated gate bipolar transistors of the output stage of FIG. 23.

FIG. 23 is a schematic diagram of the output stage of the uninterruptible power supply of FIG. 19, and provides the resynthesized AC waveform using the technique of Pulse-Width Modulation (PWM). This is shown schematically in FIG. 24, which isolates one of the sets of IGBTs.

According to this embodiment of the invention, a stiffened DC bus is used as the primary means of interconnection between a variety of loads (like a multiplicity of high horsepower AC motors) and both the AC Mains and electrical storage system and backup generators. In particular, excitation is controlled in combination with the natural switching characteristics of diode bridges to allow for generally more seamless transitions between backup and primary power sources in the case of a momentary dropout or brownout of the primary power source. Such control can be had via control of the exciter voltage and current applied to the excitation coils of a synchronous AC generator.

The concept of controlling excitation for providing generally more seamless transitions is applicable to motor control for critical functions (or backup power for critical functions) since centralizing the interconnection at the DC bus level permits Variable Frequency Drive (VFD) drive functions to be delivered with greater economy to a number of motors or loads distributed throughout a factory or large installation with the simultaneous benefit of providing ride through protection.

The "stiffening" of the DC bus and the control of excitation within multiple AC generators (a function which in prior art has been managed locally within each generator by a so called AVR or automatic voltage regulation circuit) to create threshold levels, and the variation of traditional PWM strategies in the IGBT output stages to create "resilience" against small changes in the DC Bus values, can render the DC bus suitable as a "factory wide" or institution wide connection point.

Figure 25:
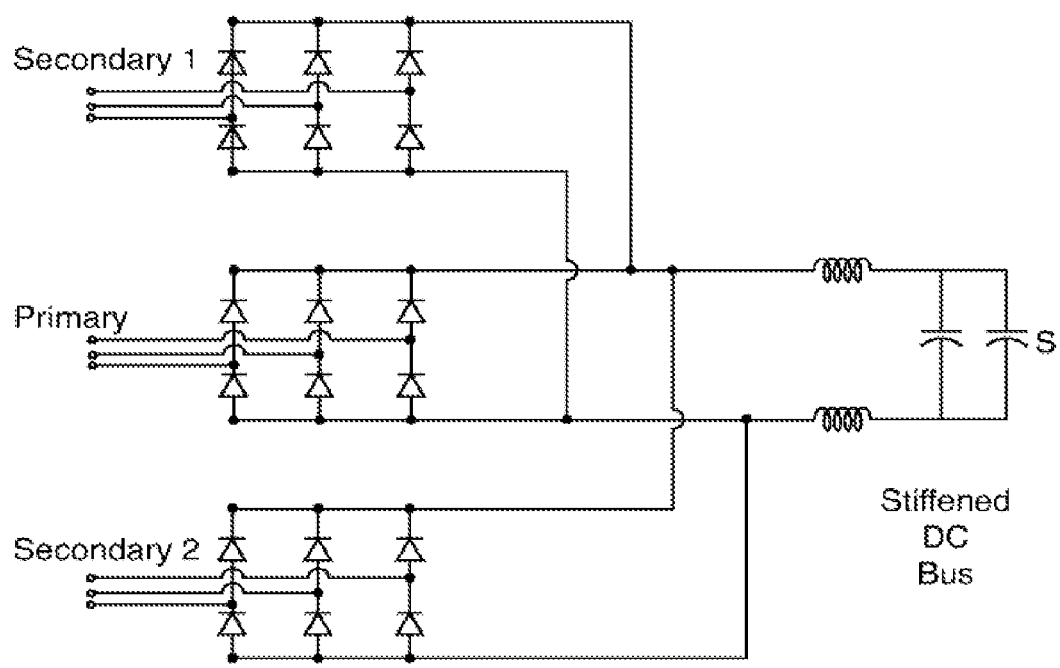
FIG. 25 is a schematic diagram showing the interconnection of multiple secondary power sources along with a primary power source to a power bus, according to an embodiment.

According to an embodiment, multiple secondary power sources and a primary power source are connected in parallel to a DC bus, as shown in FIG. 25. This bus is "stiffer" than the DC bus within a normal VFD or UPS because it has multiple possible sources of DC voltage. It may further be stiffened by the addition of supercapacitors, as suggested in EPRI, Sandia, NETL materials like Energy Storage for Distributed Energy Resources and Other Electric Power Systems (2003).

As well, the DC bus may be stiffened further by connecting batteries as secondary power sources.

Even without the parallel AC sources such a DC bus already has the advantage that it is relatively stable, depending primarily on the discharge time of the capacitors, supercapacitors, or batteries into the load.

Figure 26:
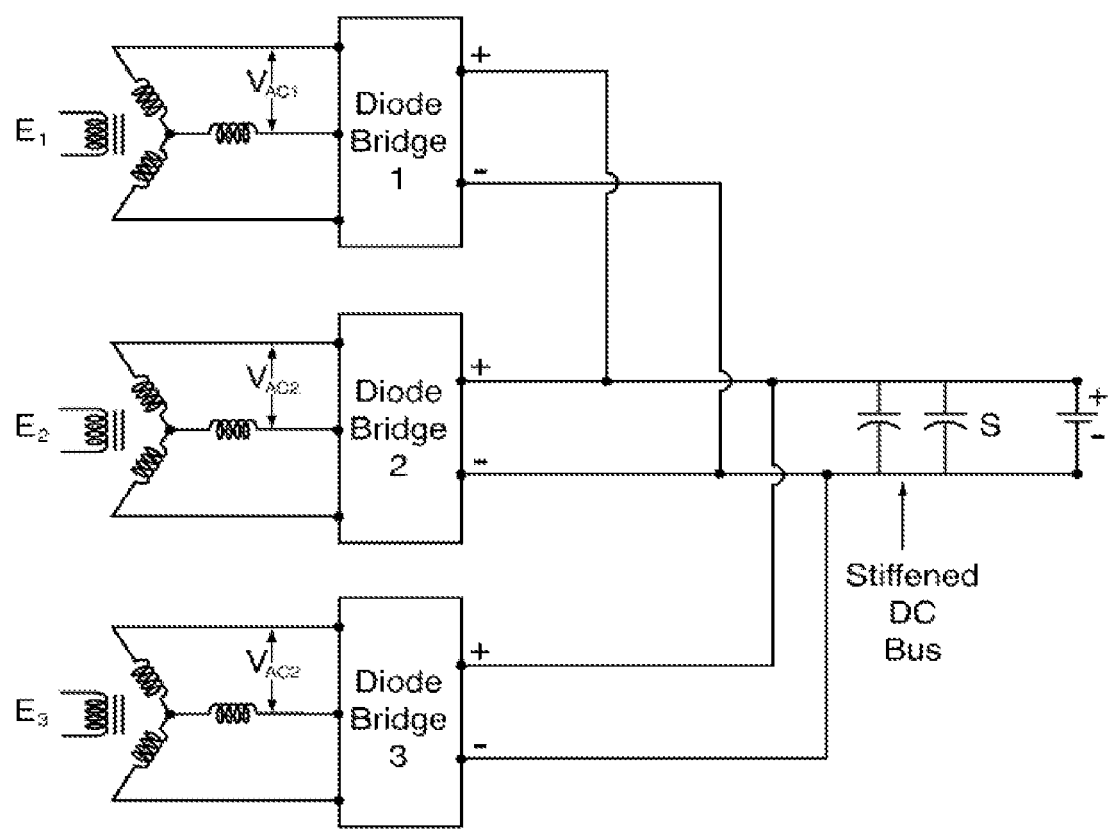
FIG. 26 is a schematic diagram showing the interconnection of multiple secondary three-phase power sources along with a primary three-phase power source to a power bus, according to an embodiment.

In large power systems the secondary sources of three phase AC power are usually also AC alternators or generators, as shown in FIG. 26.

In order to interconnect multiple secondary power sources with a primary source in this way, excitation voltages are managed so that high power generators can remain on "standby" as asynchronous "spinning" reserve with sub-cycle switching time courtesy of the shared diode switching available as part of the "stiff DC bus" structure.

Automatic Voltage Regulation (AVR) has traditionally been an analog function and, although digital control of AVR exists, and common digital control is sometimes used in large power generation facilities for the management of synchronous resources, the "stiff DC bus" provides an improvement. The traditional AVR is in fact removed, and replaced by a computer controlled exciter current (by means of a digital to analog, or D/A, converter attached to the control computer, or an Analog output module attached to a PLC. The excitation current on the generator within the apparatus is held at a level which produces a rectified output "just below" the voltage level produced by rectifying the mains. Since the shaft of the apparatus is always turning and it requires only the release of gas pressure via the solenoid valves, and the movement of the "swash plate" within the over the center pump to release that power to the shaft of the generator, the gentle control of the excitation current provides a smooth means of transitioning between several large high power sources sharing the "stiff DC bus".

For example, the generators feeding a "stiff DC bus" do not need to be synchronized with each other. This implies that flywheels, or other energy storage retrieval devices (like system 5 described above and alternatives thereof) which produce their AC output through spinning generators or alternators may be held at standby simply by holding their excitation voltage at a level just low enough that ordinary variations in the "stiff DC bus" do not traverse the peak rectified voltage level from that particular AC source.

Thus, if the primary source drops out or browns out, the power within the spinning AC alternators is drawn upon as the DC bus droops below the diode threshold for the particular secondary power source. This offers generally seamless transition to the secondary sources, and allows flywheels or systems such as system 5 and alternatives described herein, which provide 15 seconds to 2 minutes of power, to maintain the DC voltage level and retard the rate of droop.

Figure 27:
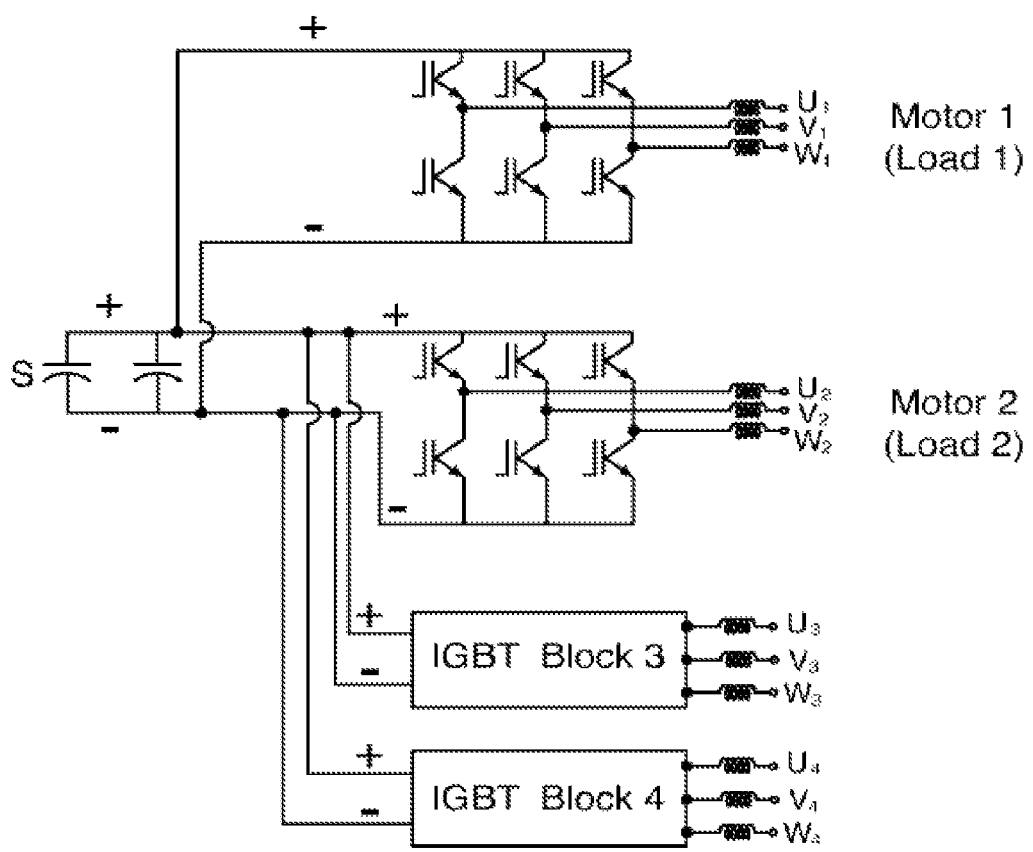
FIG. 27 is a schematic diagram showing interconnection of multiple three-phase loads to a power bus.

If all the loads are attached via independently controlled IGBT inverter blocks, as shown in FIG. 27, smooth control of critical loads can be managed in the event of a failure of the primary power source.

Priority loads can be maintained for as long as is necessary (perhaps indefinitely if the load is operating theatre power, or the cooling pump on a nuclear reactor). Non priority loads can be browned out or sequenced out smoothly since the inverted AC power that drives them is individually controlled by IGBT output blocks.

Such semiconductor output blocks have almost no cost (in comparison to, for example, a fully implemented VFD) and would offer at the very least soft starting of motors/loads at all times. However, these IGBT blocks are useful since the algorithm for the PWM module control can be modified to allow for some "droop" in the DC bus.

Figure 29:
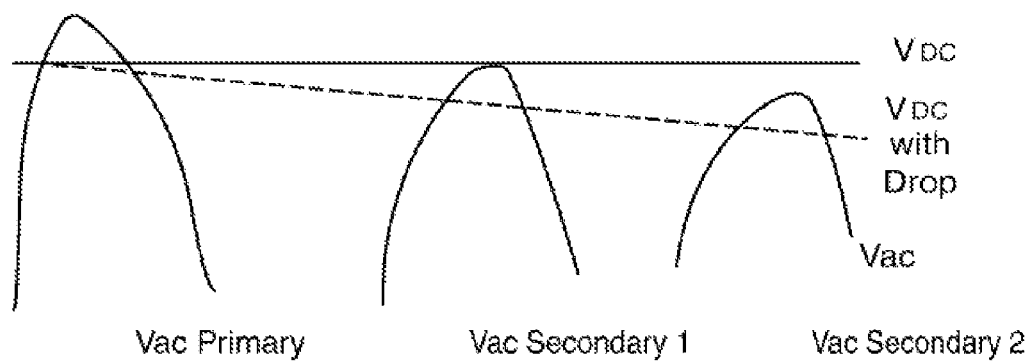
FIG. 29 is a graph showing voltage variations with primary and secondary power sources.

Such droop is inevitable with the use of the diode switching to provide seamless transition of power sources as shown in FIG. 29. It can be alleviated in part by gently raising excitation voltages on the secondary AC alternators as each of them "comes into play" in the power management. As each exciter voltage rises, so will the AC voltage associated with the particular alternator, and that source will then predominate in the diode switching which gives access to the "stiff DC bus".

Figure 28:
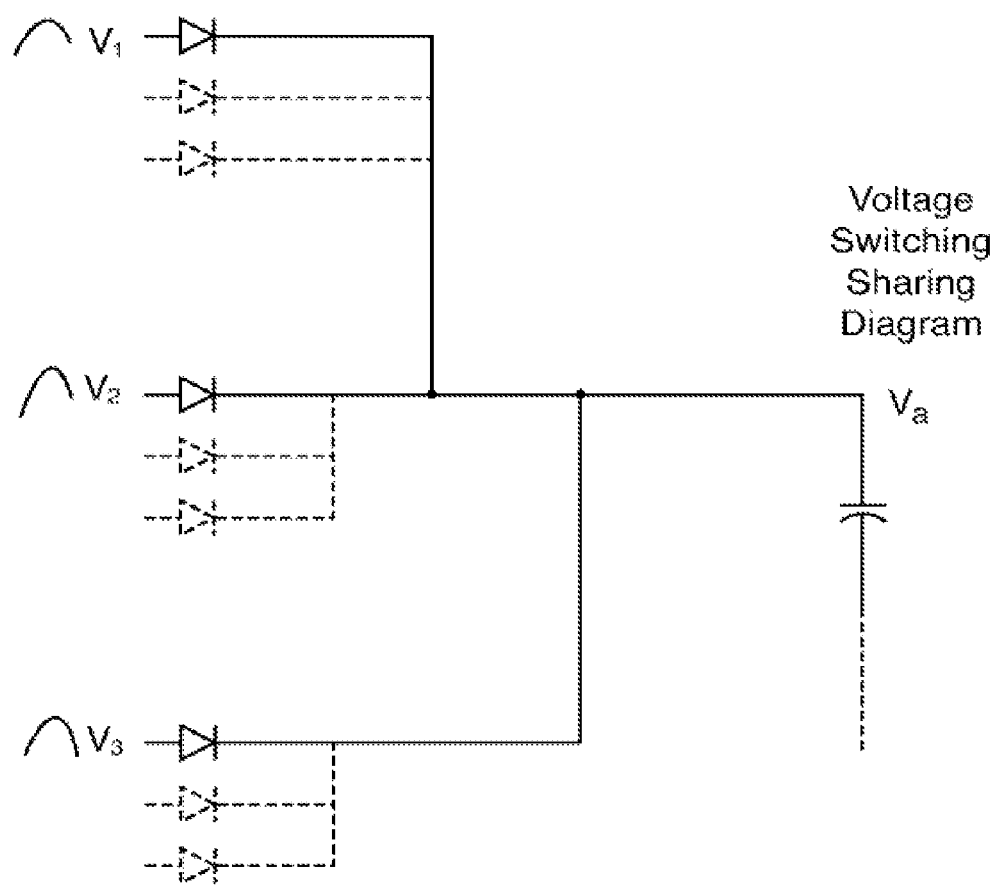
FIG. 28 is a schematic diagram showing a voltage switching mechanism.

FIG. 28 illustrates the basic voltage switching mechanism.

Figure 30:
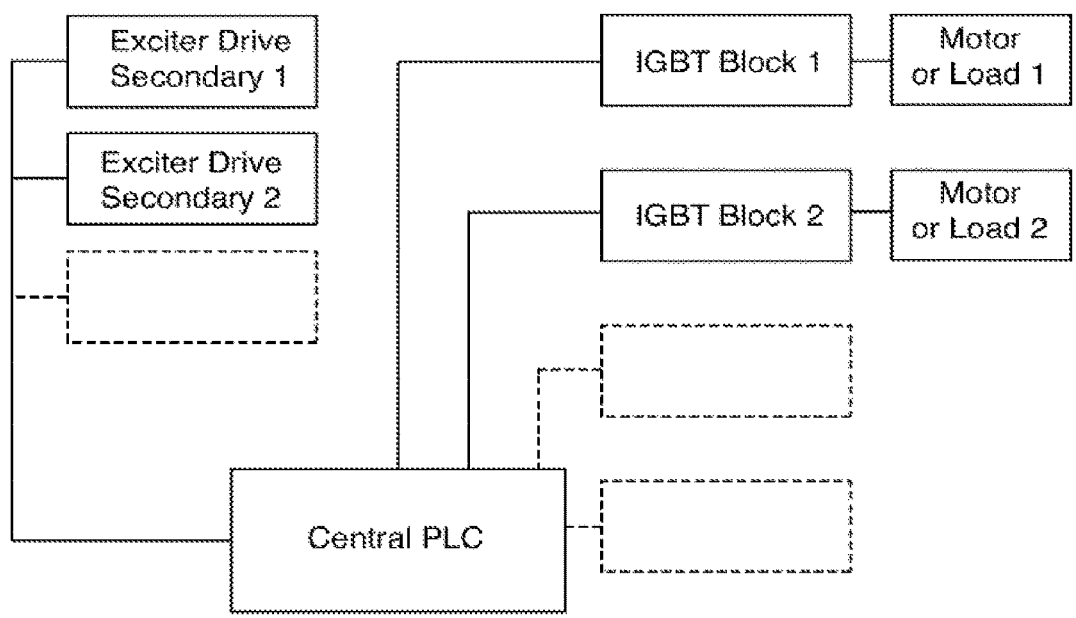
FIG. 30 is a schematic diagram showing centralized control of multiple power sources and their delivery of power to multiple loads.

FIG. 30 illustrates centralized control for the overall power management. The variation in the PWM strategy (from conventional) required to overcome droop can be simply expressed in the concept that the nominal set voltage of the "stiff DC bus" is set higher than would ordinarily be required so that the pulse widths and density of pulses required to achieve ordinary operation are shorter and lower than ordinary. As droop sets in (to the 5 or 10% limit required in this type of process or apparatus) the pulse widths and densities then "degrade" to normal. This requires a choice of slightly higher voltage IGBT's but the cost premium should not be significant.

The "stiff DC bus" structure also may require the physical running of high voltage DC cables throughout factories or facilities utilizing this process or this type of apparatus.

Although embodiments have been described, those of skill in the art will appreciate that variations and modifications may be made without departing from the purpose and scope thereof as defined by the appended claims.

For example, while embodiments have been described above as employing a unitary generator/motor subsystem, in an alternative embodiment, the generator/motor subsystem may comprise a generator that is a separate component from the motor. As such, the shaft to which the hydraulic pump 12 is coupled would also be coupled to two components: a motor and a generator. With such a configuration, the motor could be selected and/or tuned to the requirements of receiving power externally and driving the hydraulic pump, and the generator could separately be selected and/or tuned to the requirements of being driven by the hydraulic pump and generating electricity.

The generator may be oversized, such that if for example it is desired to generate 100 kW, a generator is selected that is capable of generating a multiple of the desired power. While the cost of the system infrastructure would likely increase, operational efficiencies would be gained because the heat loss in a larger generator operating within a very efficient range would be less than the heat loss in a smaller generator perhaps operating outside of its most efficient range.

In embodiments, the gas storage subsystem 100 may be embodied in the existing pipes, storage reservoirs and natural gas that currently comprise the natural gas pipeline and storage system. The invention is ideally well-suited for use with large gas storage reservoirs like those currently in use in the natural gas pipeline and geological storage reservoir system since the operating pressures and ratios are appropriate for this use (low pressures 60-700 PSI, and high pressures 700-2500 PSI). When mineral oil is used as the hydraulic fluid and the contact interface between the natural gas and the liquid piston is a contact between gas and mineral oil the resulting mixture is non-explosive, lubricating to components, and compatible with the natural gas pipeline system. This allows the gas storage system 100 to be implemented with in fact the large scale pipeline and geological (or CNG compatible) reservoir system already in place. The technology disclosed herein is believed to be in fact the first ever invented that will couple directly to the natural gas pipeline and storage reservoir system to use the available operating pressure changes that can be accommodated by the natural gas pipeline system as a means of storing and retrieving the vast quantities of energy necessary to buffer the electrical power grid, and especially to enable the deeper penetration of renewable energy sources into the grid by allowing for large scale (GWhr or GigaWatt hours) energy storage facilitated by the isothermal compression and expansion of natural gas in the existing infrastructure.

Figure 31:
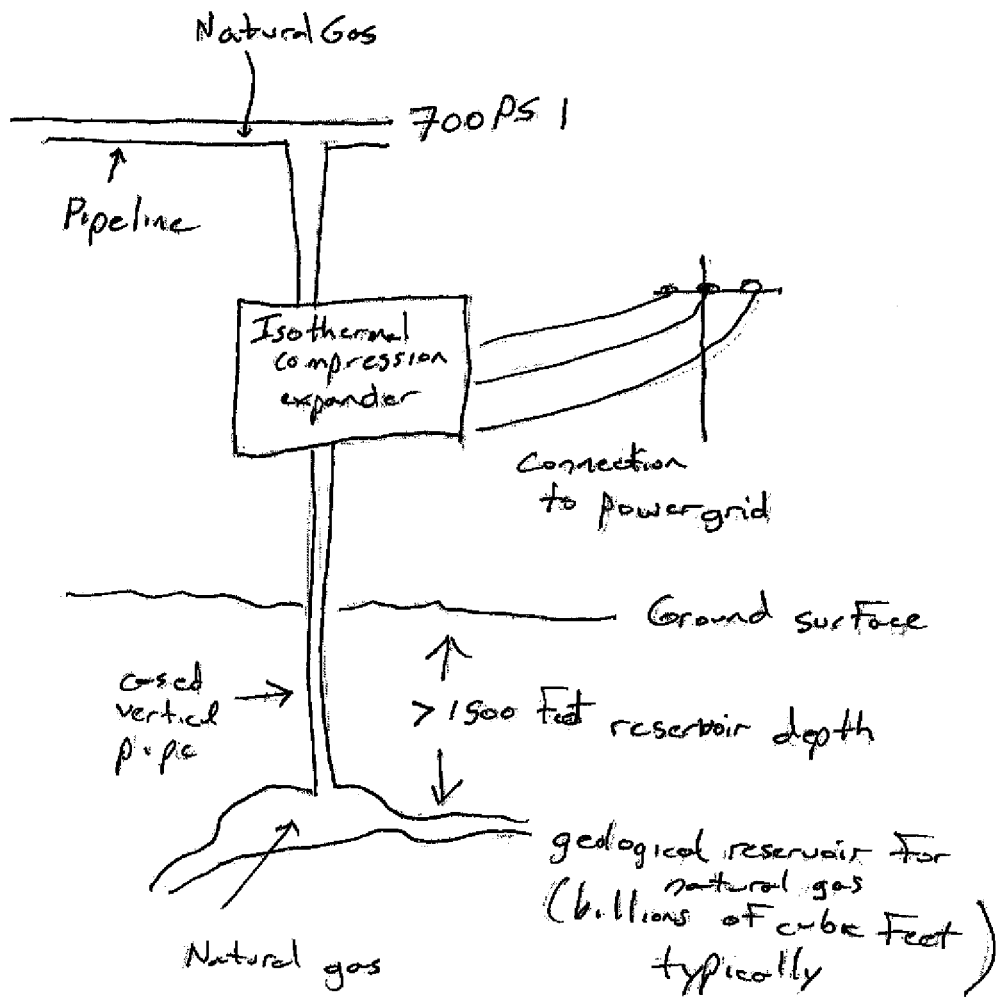
FIG. 31 is a system diagram showing the use of natural gas pipelines and storage reservoirs as the primary high and low pressure reservoirs for grid scale energy storage using the process and apparatus of isothermal liquid piston gas compression and expansion.

FIG. 31 illustrates the concept of using a natural gas pipeline as an effectively "infinite source or sink", in the practical sense, for natural gas. Natural gas can then be compressed to sustainably store energy, and expanded as needed. While the existing natural gas storage reservoirs typically already compress gas for in excess of one hundred days a year, the energy of compression is typically lost when the gas is expanded.

Figure 32:
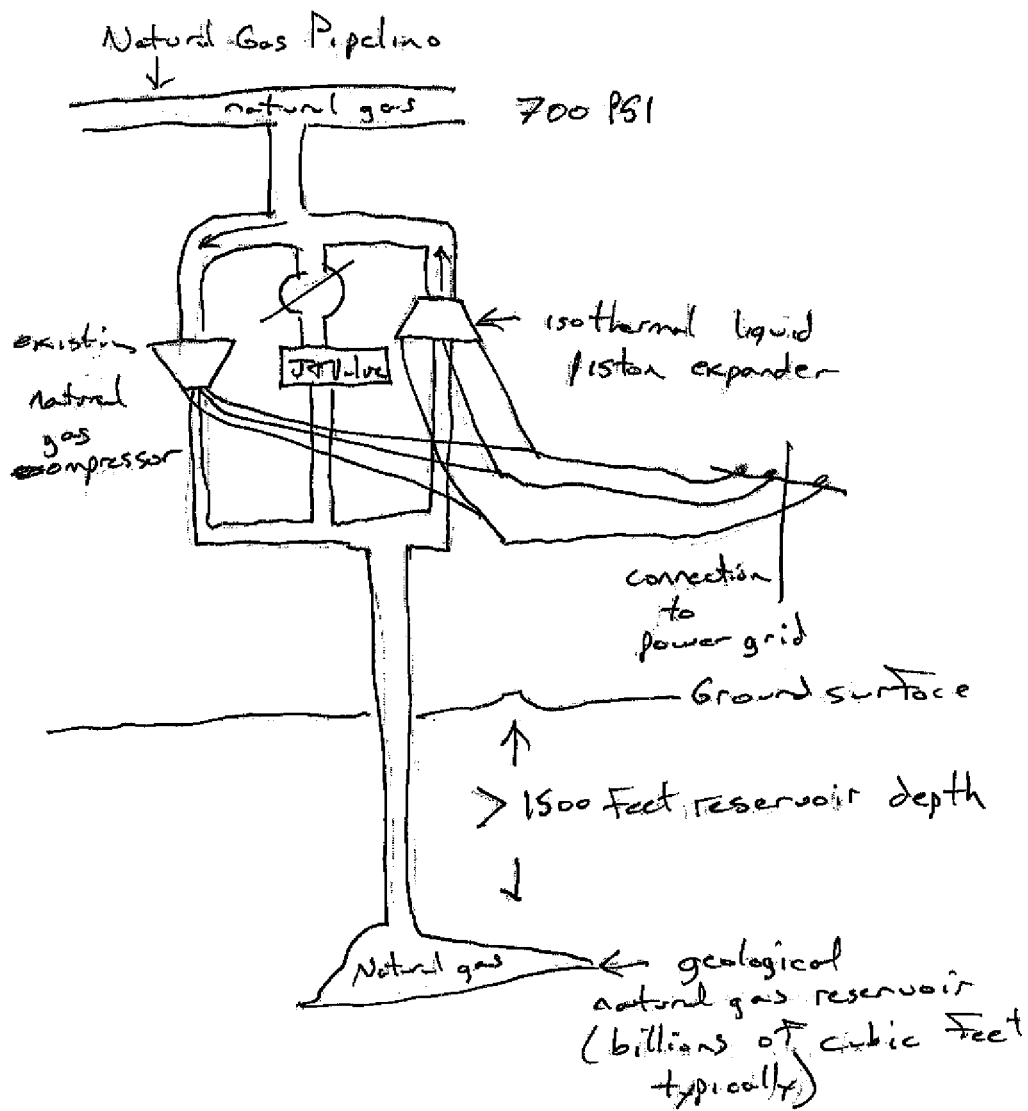
FIG. 32 is a system diagram showing the use of an isothermal liquid piston gas expander as an addition to the existing gas compression and pipeline facilities in place (normally a gas compressor and a JT valve for expansion—the isothermal liquid piston gas expander is a unique component which recovers the energy normally lost when the JT valve is used to facilitate pressure let down in gas expansion). The isothermal liquid piston gas expander represents a small addition to existing infrastructure with a large gain in functionality.

FIG. 32 illustrates an incremental modification to the existing gas pipeline/storage reservoir system which offers a great immediate return—to bypass the existing Joule Thompson (JT) valves, and instead expand gas through the liquid piston isothermal expander already disclosed herein. This process will typically recover GWhrs of energy that is currently being thrown away. The energy is already stored when conventional piston compressors drive the gas downward into the high pressure geological reservoirs (for seasonal arbitrage purposes). The energy storage efficiency of a conventional (as opposed to liquid piston isothermal) compressor is lower, but the stored PV (pressure) energy of the gas is still available and is currently completely wasted.

Figure 33:
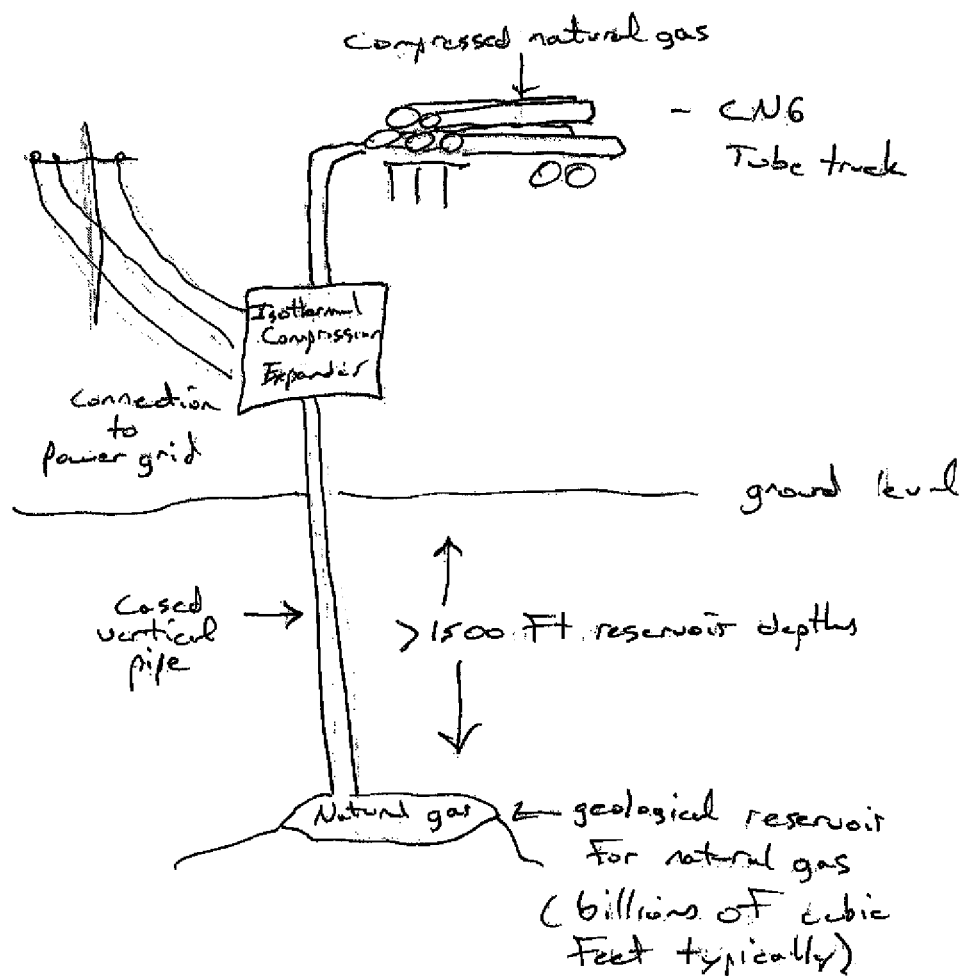
FIG. 33 is a system diagram showing the use of above ground CNG storage vessels like CNG tube trucks to act as the low pressure reservoir in the low pressure/high pressure system that relies on existing natural gas infrastructure and technology to act as the basis of the energy storage that relies on the compression and expansion of natural gas as the mechanism for grid scale energy storage and retrieval.

FIG. 33 illustrates another embodiment of the invention— the use of conventional CNG tube trucks or other storage vessels to act as reservoirs (either in conjunction with geological reservoirs, or simply in conjunction with other CNG storage vessels). The existing technology for CNG is safe, mature technology and cost effective for gas storage. The use of natural gas is in fact simpler and more cost effective to implement than the storage of compressed air, since air contains oxygen—a reactive element—and accordingly there are more regulatory and cost restrictions on pressure vessels storing high pressure air.

Figure 34:
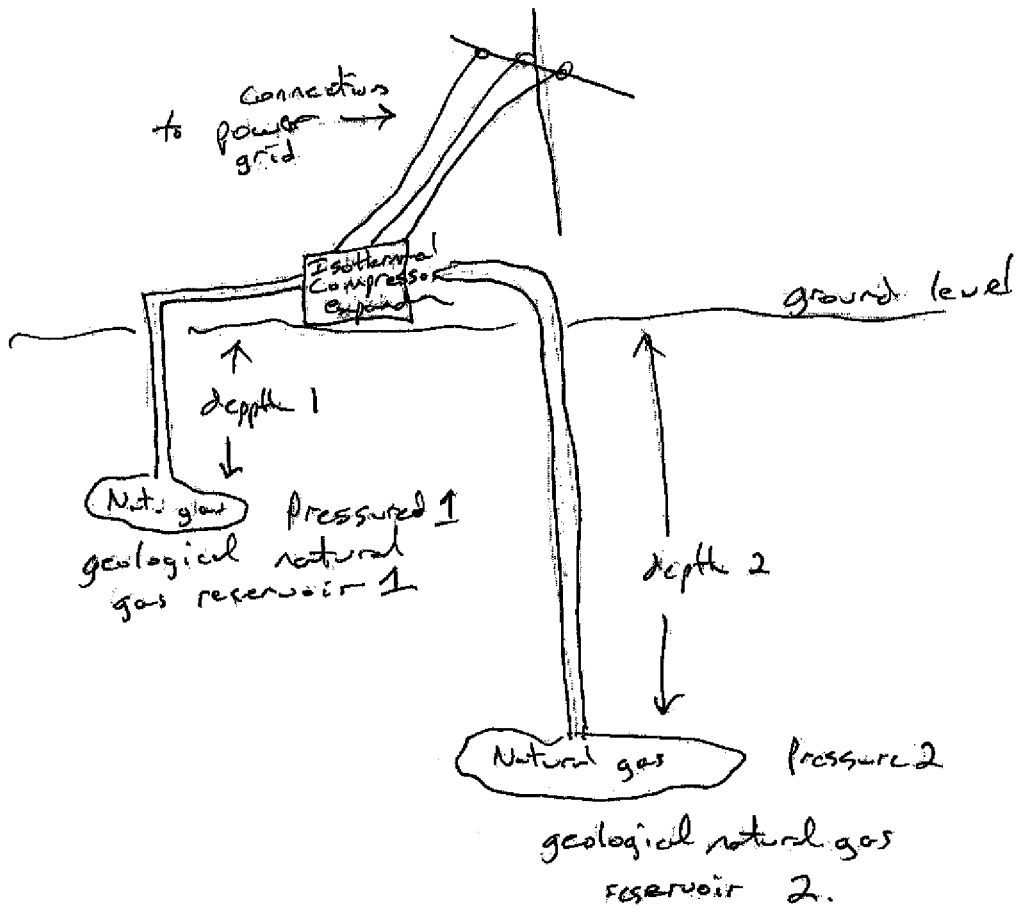
FIG. 34 is a system diagram showing the use of two reservoirs connected by pipeline to a liquid piston isothermal gas compressor/expander so that without reference to the rest of the natural gas pipeline/storage network, gas can be compressed or expanded according to the dispatch needs of the power grid. The existing natural gas pipelines and reservoirs rely on proven safe and extremely cost effective technology, and their alternate use with the unique technology of liquid piston isothermal gas compression and expansion creates a green use for existing energy infrastructure.

FIG. 34 illustrates another aspect of the invention. In this aspect, isothermal liquid piston compressor/expanders are positioned on a pipeline between two reservoirs of different depths. Since reservoir depth determines the basic operating pressure, and reservoirs are often very large (reservoirs of a few billion standard cubic feet-bscf—sell for less than $10,000,000) it is possible to configure an isothermal compressor/expander between two reservoirs operating at different depths and compress or expand a slug of gas that represents only a small portion of the reservoir capacity, but which still stores and recovers many GWhrs of electrical energy. The key advantage of the embodiment represented in FIG. 34 is that it does not require that the gas "come from" or "go to" any other part of the natural gas pipeline and storage system, so the electrical energy can be freely stored or recovered on the dispatch of the electrical system operator.

With proven efficiencies in the 70-80% range the liquid piston isothermal compressor/expander can deliver high levels of power at times when the power grid requires the energy. The use of natural gas infrastructure greatly reduces the cost, and facilitates the implementation of critically needed grid storage, and is a key element when used in combination with isothermal liquid piston compression and expansion.

Figure 35:
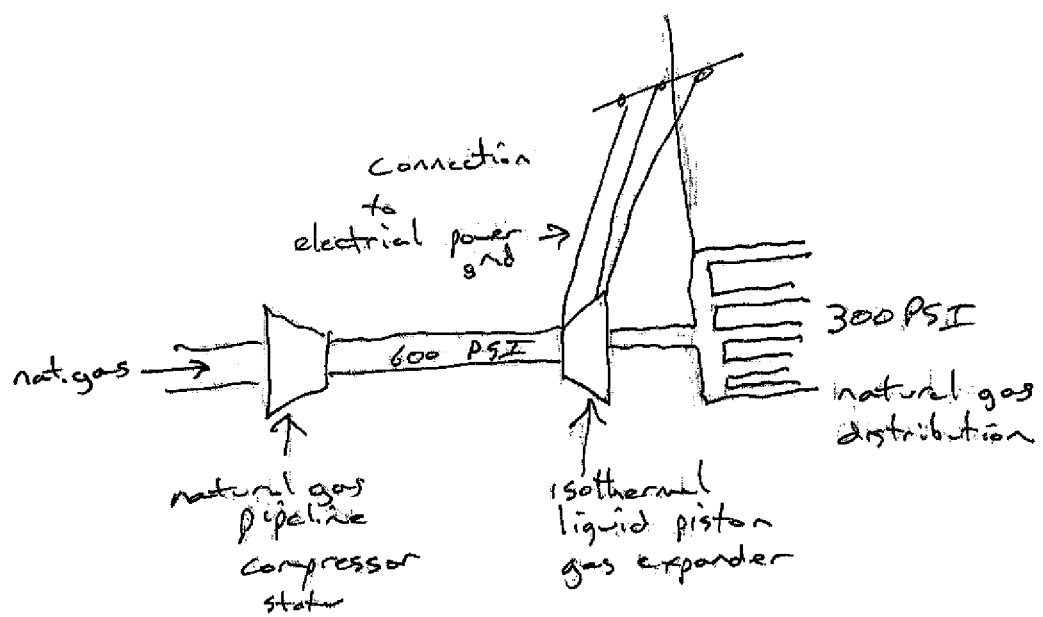
FIG. 35 is a system diagram illustrating another embodiment of the invention which is to recover the energy of "let down" in gas pressure which occurs as part of the natural gas pipeline system.

FIG. 35 illustrates another embodiment of the invention which is to recover the energy of "let down" in gas pressure which occurs as part of the natural gas pipeline system. Energy is already stored in the compression that occurs in ordinary pipeline transport of gas. By installing liquid piston isothermal expanders which will recover energy continuously as gas is expanded as its pressure drops from long distance pipeline pressure to local pipeline pressures, energy that is already available is recovered.

When the invention is applied to the natural gas pipeline and storage system, the high pressure reservoir may be a geological structure, like a depleted gas reservoir (for example a pinnacle reef structure), or a salt dome. These reservoirs are already commonly used for the storage of natural gas. The reservoir's natural operating pressure is normally largely determined by its depth with a pressure of about 1 PSI/foot of depth so that for example a reservoir at an approximate depth of 5000 feet would have an operating pressure of approximately 2500 feet. If the reservoir is at a depth of greater than 1500 ft below the surface, then it can be used as the high pressure reservoir of the energy storage system and is ideal well-suited for use with natural gas pipelines, since such pipelines ordinarily operate at pressures or less than 700 PSI.

What is claimed is:

1. A system for storing and releasing energy, comprising:
   a generator/motor subsystem;
   a hydraulic pump for pumping hydraulic fluid between first and second pump ports in response to force applied by the generator/motor subsystem and also capable of imparting force to the generator/motor subsystem in response to hydraulic fluid being caused to flow between the first and second pump ports;
   a first compression/expansion vessel for exchanging hydraulic fluid with the hydraulic pump via the first pump port;
   a second compression/expansion vessel for exchanging hydraulic fluid with the hydraulic pump via the second pump port;
   a gas storage subsystem for selectively storing natural gas from, or releasing gas to, the first and second gas compression/expansion vessels, the gas storage subsystem comprising a geological reservoir;
   an internal heat exchanger within each of the first and second compression/expansion vessels for exchanging heat between the hydraulic fluid and the natural gas therein, each internal heat exchanger having a very large thermal mass relative to the mass of natural gas within the first and second compression/expansion vessels;
   a control subsystem for controlling at least a plurality of gas valves associated with the gas storage subsystem to switch between the storing and releasing, the control system during releasing further controlling the release of natural gas, after decompression, to be conveyed outside of the system for use as a combustible fuel;
   wherein, during storing, responsive to hydraulic fluid being pumped by the hydraulic pump between the first and second pump ports, natural gas is caused to be compressed in the gas storage subsystem thereby to store energy, and
   wherein, during releasing, responsive to pressure from release of compressed natural gas from the gas storage subsystem, hydraulic fluid is forced to flow between the first and second pump ports thereby to release energy.

2. The system of claim 1, wherein energy from an electrical power grid is stored and electrical energy retrieved is conveyed to the electrical power grid.

3. The system of claim 1, wherein energy from one or more renewable energy sources is stored and retrieved for dispatching to the electrical power grid.

4. A method of storing and releasing natural gas comprising:
   compressing natural gas into at least one high pressure reservoir for storage;
   selectively releasing stored natural gas, the releasing comprising:
      decompressing compressed natural gas from the high pressure reservoir into a liquid piston expander thereby to cause the liquid piston expander to move hydraulic fluid through a hydraulic pump associated with an electrical generator;
      conveying decompressed natural gas out of the liquid piston expander for use as a combustible fuel; and
      conveying electricity generated by the electrical generator to an electrical power system for distribution.

5. A method of operating a geological natural gas reservoir system, the reservoir system coupled to a pipeline conveying natural gas to be used as fuel, the method comprising:
   selectively storing natural gas from the pipeline, the storing comprising:
      diverting a portion of natural gas being conveyed along the pipeline; and
      compressing the diverted portion of natural gas into at least one geological reservoir for storage;
   selectively releasing stored natural gas back to the pipeline, the releasing comprising:
      decompressing compressed natural gas from the at least one geological reservoir into a liquid piston expander thereby to cause the liquid piston expander to move hydraulic fluid through a hydraulic pump associated with an electrical generator;
      releasing decompressed natural gas from the liquid piston expander into the pipeline for use as a combustible fuel; and
      conveying electricity generated by the electrical generator to an electrical power system for distribution.

6. A natural gas reservoir system comprising:
   a geological reservoir;
   a compressor in fluid communication with a natural gas pipeline, the compressor configured to compress natural gas diverted from the pipeline into the geological reservoir for storage;
   a liquid piston expander in fluid communication with the geological reservoir and configured to pump hydraulic fluid in response to the release of stored compressed natural gas selectively to the liquid piston expander from the geological reservoir, the liquid piston expander further configured to release the expanded natural gas to the natural gas pipeline for use as a combustible fuel;
   a hydraulic pump operable in response to movement therethrough of hydraulic fluid caused by movement of the liquid piston; and
   an electrical generator associated with the hydraulic pump to generate electricity in response to operation of the hydraulic pump.

* * * * *